United States Patent
Tamura et al.

(10) Patent No.: US 9,533,705 B2
(45) Date of Patent: Jan. 3, 2017

(54) VEHICLE STEERING SYSTEM

(71) Applicant: HONDA MOTOR CO., LTD., Minato-Ku, Tokyo (JP)

(72) Inventors: Norifumi Tamura, Saitama (JP); Yoshifumi Banno, Saitama (JP); Yuki Endo, Saitama (JP); Shoji Hamada, Saitama (JP); Yoshinobu Mukai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 14/332,756

(22) Filed: Jul. 16, 2014

(65) Prior Publication Data

US 2015/0025745 A1 Jan. 22, 2015

(30) Foreign Application Priority Data

Jul. 16, 2013 (JP) .................................. 2013-147272

(51) Int. Cl.
*B62D 6/00* (2006.01)
*B62D 5/04* (2006.01)
*B62D 6/04* (2006.01)

(52) U.S. Cl.
CPC ................. *B62D 6/00* (2013.01); *B62D 5/046* (2013.01); *B62D 6/04* (2013.01)

(58) Field of Classification Search
CPC ............ B62D 6/00; B62D 5/046; B62D 6/04; B62D 15/025; B62D 6/008; B62D 6/003; B62D 9/002
See application file for complete search history.

(56) References Cited

U.S. PATENT DOCUMENTS 5,528,497 A * 6/1996 Yamamoto ............... B62D 6/04
  180/446
7,540,351 B2 * 6/2009 Kataoka ............... B62D 5/0463
  180/443
(Continued)

FOREIGN PATENT DOCUMENTS

CN  101233482 A  7/2008
CN  101249840 A  8/2008
(Continued)

OTHER PUBLICATIONS

Office Action mailed Feb. 22, 2016 for corresponding Chinese Application No. 201410339309.3.
(Continued)

*Primary Examiner* — Tuan C. To
(74) *Attorney, Agent, or Firm* — Carrier Blackman & Associates, P.C.; Joseph P. Carrier; Jingli Wang

(57) ABSTRACT

A vehicle steering system can keep the comfort of steering feeling for a driver, even in a situation, such as traveling on a cant road or in a crosswind, where a unidirectional-drift behavior of a vehicle occurs, and includes an electric motor, a steering angle sensor, a steering torque sensor, and an EPS_ECU that controls driving power of the electric motor, when the vehicle is traveling straight, based on vehicle information including a steering torque and a steering angle, to perform a control for applying an assist torque to a steering system. The EPS_ECU includes an integrating unit for calculating an integrated torque value obtained by integrating the steering torque, and a steering effort assist controlling unit for performing an anti-unidirectional-drift control over the driving power of the electric motor, when the integrated torque value exceeds the threshold value, so as to cancel the unidirectional-drift behavior of the vehicle.

16 Claims, 17 Drawing Sheets

(56) References Cited

U.S. PATENT DOCUMENTS

| | | | | |
|---|---|---|---|---|
| 8,294,407 B2* | 10/2012 | Mikamo | ............... | B62D 5/046 318/400.26 |
| 8,392,064 B2* | 3/2013 | Thrun | ............... | B62D 15/025 701/41 |
| 8,744,685 B2* | 6/2014 | Nakano | .................. | B62D 6/00 701/41 |
| 8,825,300 B2* | 9/2014 | Tatsukawa | ............. | B62D 6/00 180/422 |
| 2004/0238265 A1* | 12/2004 | Tsuchiya | ............... | B62D 6/003 180/446 |
| 2005/0005691 A1* | 1/2005 | Ono | ...................... | B60T 8/172 73/146 |
| 2007/0017735 A1* | 1/2007 | Kataoka | ............. | B62D 5/0463 180/446 |
| 2007/0027586 A1 | 2/2007 | Deng et al. | | |
| 2008/0183342 A1* | 7/2008 | Kaufmann | ............ | B60K 28/066 701/1 |
| 2008/0217099 A1* | 9/2008 | Reungwetwattana | | B62D 5/0472 180/446 |
| 2010/0145575 A1* | 6/2010 | Switkes | .............. | B62D 15/025 701/41 |
| 2011/0005855 A1* | 1/2011 | Mikamo | ............... | B62D 5/046 180/443 |
| 2011/0022270 A1 | 1/2011 | Tamaizumi et al. | | |
| 2011/0029200 A1* | 2/2011 | Shah | ..................... | B62D 5/008 701/41 |
| 2013/0190984 A1* | 7/2013 | Kawai | ................. | B62D 15/025 701/41 |
| 2013/0253767 A1* | 9/2013 | Lee | ....................... | B60W 50/04 701/42 |
| 2014/0005892 A1* | 1/2014 | Bar | ....................... | B60W 30/12 701/41 |
| 2014/0222293 A1* | 8/2014 | Raad | ..................... | B62D 6/00 701/42 |

FOREIGN PATENT DOCUMENTS

| | | |
|---|---|---|
| CN | 101927785 A | 12/2010 |
| JP | H0834360 A | 2/1996 |
| JP | 2000-159135 A | 6/2000 |
| JP | 2001-001923 A1 | 1/2001 |
| JP | 2006264617 A | 10/2006 |
| JP | 2007112366 A | 5/2007 |
| JP | 2009-255678 A | 11/2009 |
| JP | 2011161942 A | 8/2011 |
| JP | 2011162160 A | 8/2011 |
| WO | 2010144049 A1 | 12/2010 |

OTHER PUBLICATIONS

Office Action dated Apr. 12, 2016 corresponding to Japanese Patent Application 2014-146230.

Japanese Office Action dated Nov. 8, 2016, issued in the corresponding Japanese patent application JP 2014-146230.

* cited by examiner

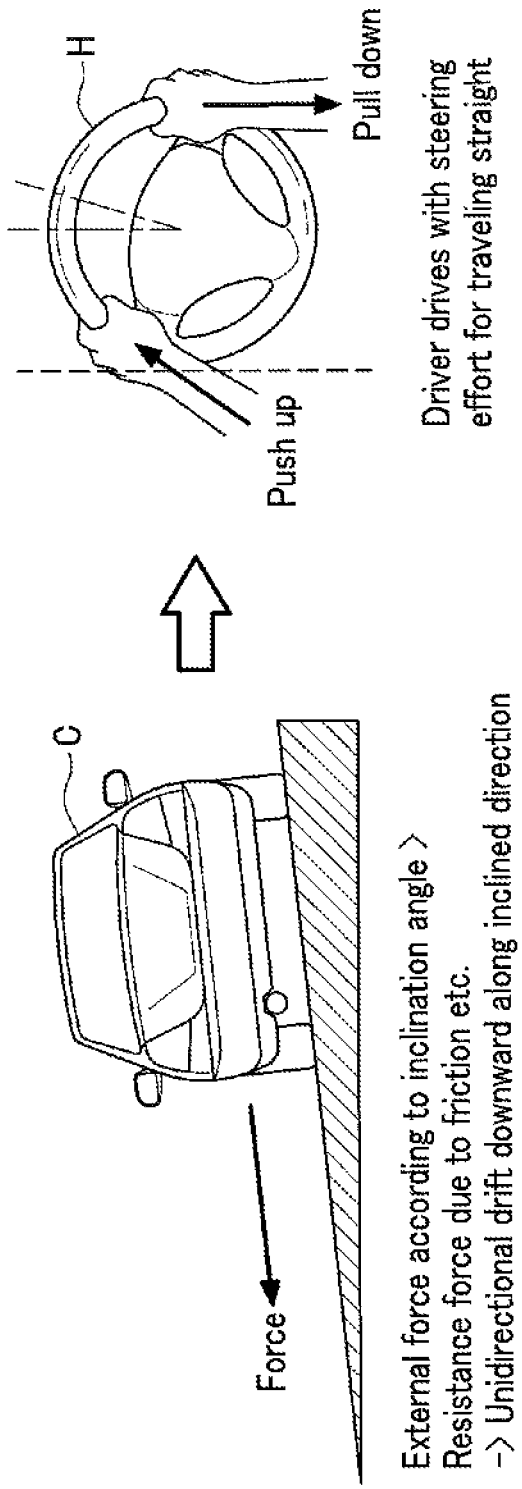

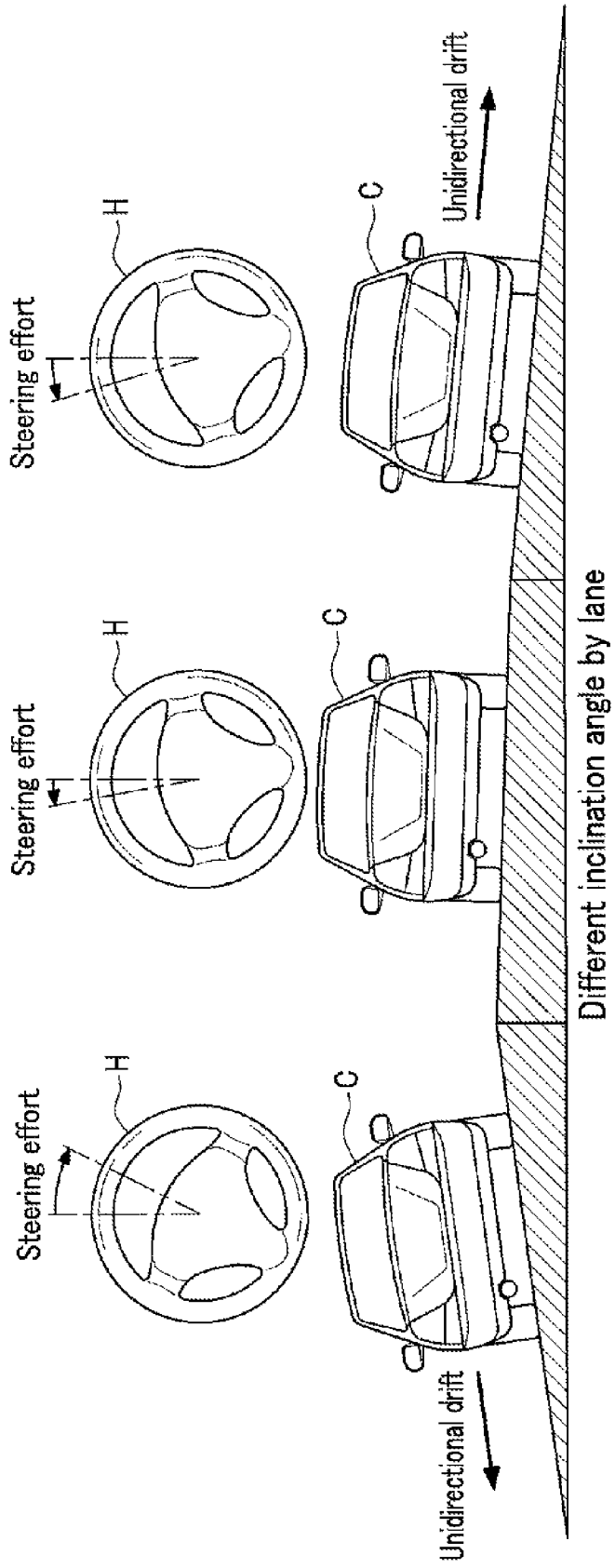

FIG. 7A
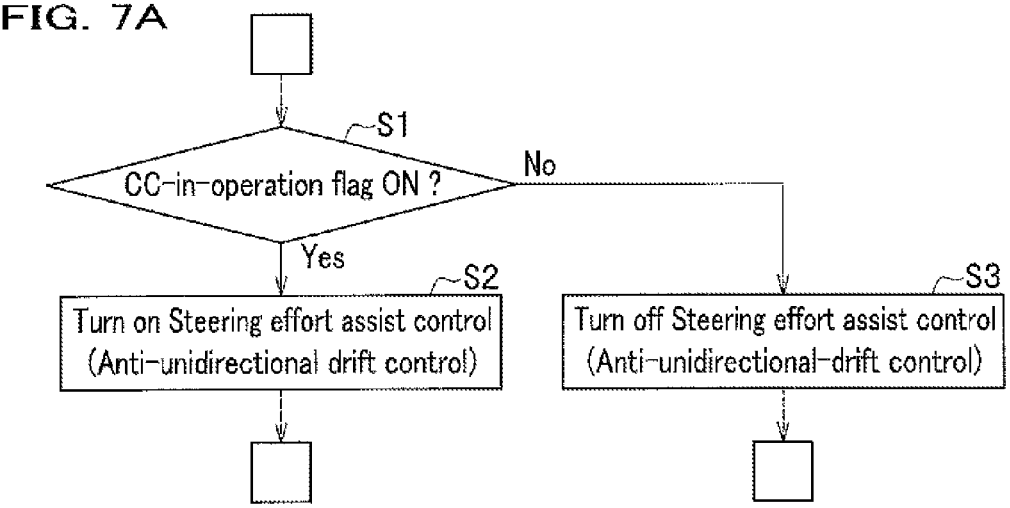
FIG. 7B CC switch position - temporal transition
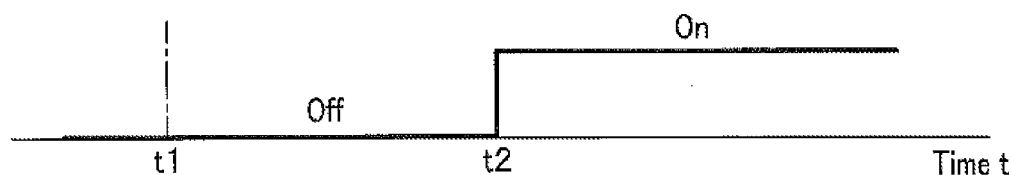
FIG. 7C Actual steering angle - temporal changes
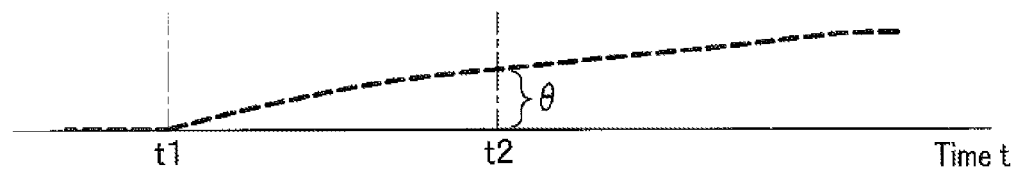
FIG. 7D Anti-unidirectional-drift steering angle - temporal changes
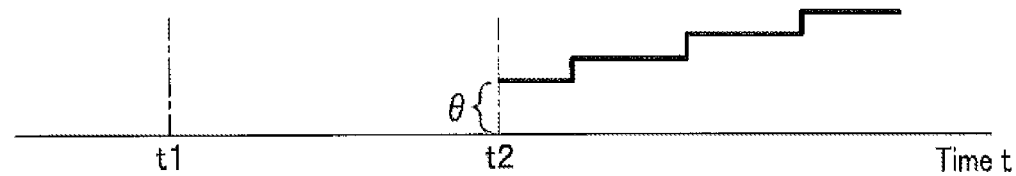
FIG. 7E Anti-unidirectional-drift steering angle - temporal changes

VEHICLE STEERING SYSTEM

TECHNICAL FIELD

The present invention relates to a vehicle steering system having an electric motor for steering.

BACKGROUND OF THE INVENTION

When a vehicle travels on a cant road, which is a road inclined in the width direction, or in a crosswind, a behavior occurs in which the vehicle drifts on the cant road to the lower side of the inclined direction under the influence of gravity, and drifts in the crosswind on the leeward side by the influence of the wind. Such a behavior is called a unidirectional drift of a vehicle. In order to continue to drive the vehicle straight against the behavior of the unidirectional drift of the vehicle, a driver of the vehicle continuously needs to turn the steering wheel toward the upper side of the inclined direction or the windward side. That is, in a situation where a behavior of a unidirectional drift of a vehicle occurs, in order to maintain a straight traveling of the vehicle, a driver of the vehicle is required to continuously provide a steering effort in a direction opposite to the direction the vehicle drifts (the direction of the drift).

For example, in Japanese Patent Application Publication No. 2001-001923, a vehicle steering system is disclosed that obtains, when a disturbance effecting a vehicle behavior such as an inclination on a cant road or a crosswind occurs, i.e., when a vehicle travels on a cant road, in a crosswind, or the like, an effect value of disturbance which corresponds to a magnitude of an effect of the disturbance to the vehicle behavior, and then performs an assist torque control according to the steering in accordance with the influence value of disturbance, to cancel the effect of the disturbance to the vehicle behavior.

SUMMARY OF THE INVENTION

Problems to be Solved

However, the vehicle steering system according to Japanese Patent Application Publication No. 2001-001923 (see FIG. 4) performs a control for providing a dead zone across the neutral point with respect to a steering torque, and generating an assist torque for the steering at a timing when the steering torque falls outside the dead zone. Therefore, as the assist torque for the steering is not generated during the time when the steering torque is converging in the region of the dead zone at around the neutral point of the steering torque, it fails to reduce the physical burden for a steering operation by the driver. As a result, the comfort of steering feeling provided to the driver has been impaired.

Therefore, it is an objective of the present invention to provide a vehicle steering system that is capable of keeping the comfort of steering feeling provided to the driver, even when a vehicle travels straight in a situation, such as traveling on a cant road or traveling in a crosswind, where a unidirectional drift behavior of the vehicle occurs.

Solution to Problems

In order to solve the above problems, a vehicle steering system (1) according to the present invention includes: an electric motor that applies an assist torque for assisting steering of a steering system of a vehicle; a steering torque detecting unit that detects a steering torque required for steering of the steering system; a steering angle detecting unit that detects a steering angle according to the steering system; a traveling state detecting unit that detects whether or not the vehicle is traveling straight; and a control device that, when the vehicle is traveling straight, controls driving power of the electric motor based on vehicle information including the steering torque and the steering angle to impart the assist torque to the steering system, wherein the control device includes, as the most important features: an integrating unit that calculates an integrated torque value which is an integrated value of the steering torque; and an anti-unidirectional-drift controlling unit that performs a unidirectional drift control over the driving power of the electric motor so as to cancel or compensate for the unidirectional drift behavior of the vehicle, based on the integrated torque value and mapping (relationship) information of the driving power of the electric motor relative to a change in the integrated torque value.

In the vehicle steering system (1) according to the present invention, the anti-unidirectional-drift controlling unit performs the unidirectional drift torque control over the driving power of the electric motor so as to cancel the unidirectional drift behavior of the vehicle, based on the integrated torque value and the mapping information of the driving power of the electric motor relative to a change in the integrated torque value.

Here, for example, there can be a case where a vehicle is driven to travel straight under a situation in which the steering of the vehicle is pulled leftward in the traveling direction due to the effect of disturbance such as a cant road or a crosswind. In this case, the driver tries to keep turning the steering wheel rightward in the traveling direction to drive the vehicle straight against the trend of drifting leftward in the traveling direction of the vehicle. In such a situation, the unidirectional drift control is performed to reduce the steering torque rightward in the traveling direction based on the integrated torque value rightward in the traveling direction so as to cancel the unidirectional drift behavior of the vehicle. As a result, a physical burden of the driver is relieved that is to keep turning the steering wheel rightward in the traveling direction.

Thus, according to the vehicle steering system (1) of the present invention, the comfort of steering feeling provided to the driver can be retained, even when a vehicle travels straight in a situation, such as traveling on a cant road or in a crosswind, where a unidirectional drift behavior of the vehicle occurs.

Note that in the embodiments described later, a description will be given of the anti-unidirectional-drift controlling unit, with an example in which the unidirectional drift control is performed if the integrated torque value exceeds a predetermined threshold.

A vehicle steering system (2) of the present invention accords to the vehicle steering system (1), wherein the integrating unit calculates the integrated torque value that is the integrated value of the steering torque when the vehicle is traveling straight.

According to the vehicle steering system (2) of the present invention, since an integrated torque value is calculated that is the integrated value of the steering torque when a vehicle, for which a unidirectional drift control is actually required, is traveling straight, to perform a unidirectional drift control based on the integrated torque value calculated above so as to cancel the unidirectional drift behavior of the vehicle, a practical and accurate unidirectional drift control can be realized.

A vehicle steering system (3) of the present invention accords to the vehicle steering system (1), wherein the anti-unidirectional-drift controlling unit obtains information of the driving power of the electric motor, which power is associated with the integrated torque value, based on the integrated torque value and the mapping information of the driving power of the electric motor relative to a change in the integrated torque value, and performs an operation for reducing high frequency components on the information of the driving power of the electric motor obtained above to perform the unidirectional drift control over the driving power of the electric motor using the information of the driving power of the electric motor after the operation so as to cancel the unidirectional drift behavior of the vehicle.

According to the vehicle steering system (3) of the present invention, since the anti-unidirectional-drift controlling unit performs a unidirectional drift control over the driving power of the electric motor, using the information of the driving power from the electric motor mainly having low-frequency components after reducing high-frequency components derived from the coarseness of the road surface, so as to cancel the unidirectional drift behavior of the vehicle, an accurate unidirectional drift control can be realized with an effect from high frequency noise components reduced.

In addition, a vehicle steering system (4) of the present invention accords to the vehicle steering system (1), wherein the anti-unidirectional-drift controlling unit performs the unidirectional drift control over the driving power of the electric motor to cancel the unidirectional drift behavior of the vehicle based on the integrated torque value and the mapping information of the driving power of the electric motor relative to a change in the integrated torque value, by moving the midpoint of the steering system to a target anti-unidirectional-drift steering angle value.

According to the vehicle steering system (4) of the present invention, since the anti-unidirectional-drift controlling unit performs a unidirectional drift control over the driving power of the electric motor to cancel the unidirectional drift behavior of the vehicle by moving the midpoint of the steering system to the target anti-unidirectional-drift steering angle value, an anti-unidirectional-drift control can be realized with high accuracy in an appropriate procedure.

Further, a vehicle steering system (5) of the present invention accords to the vehicle steering system (4), wherein an initial value of the anti-unidirectional-drift steering angle value is set to a predetermined value.

According to the vehicle steering system (5) of the present invention, since the initial value of the anti-unidirectional-drift steering angle value is set to a predetermined value, such as 0 degree, even in a case of performing the anti-unidirectional-drift control in the middle of turning the vehicle, a situation can be avoided in advance where an excessive anti-unidirectional drift steering angle value is given. As a result, an anti-unidirectional-drift control can be realized with high accuracy.

Furthermore, a vehicle steering system (6) of the present invention accords to the vehicle steering system (5), wherein the steering angle detecting unit has a feature of detecting a steering angle of a steering wheel in the steering system, and the predetermined value is set to the steering angle value of the steering wheel detected by the steering angle detecting unit when the anti-unidirectional-drift controlling unit starts the anti-unidirectional-drift control.

According to the vehicle steering system (6) of the present invention, since the predetermined value set as the initial value of the anti-unidirectional-drift steering angle value is set to the steering angle values of the steering wheel detected by the steering angle detecting unit when the anti-unidirectional-drift controlling unit starts the anti-unidirectional-drift control, the moving amount can be suppressed when the midpoint of the steering system is moved to the target anti-unidirectional-drift steering angle value. As a result, a wait time, until steering effort of the steering system by the driver is actually reduced, can be shortened.

In general, if a cruise control operating unit is operating, steering effort of the steering system by the driver tends to be weaker, compared to a case where the cruise control unit is not operating. The reason that the cruise control process is operating is often due to a background that there is a request for mitigating driving load from the driver.

From this background, a vehicle steering system (7) of the present invention accords to the vehicle steering system (1), wherein the anti-unidirectional-drift controlling unit allows the cruise control operating unit, which performs a cruise control of the vehicle, to perform the anti-unidirectional-drift control if the cruise control operating unit is operating.

According to the vehicle steering system (7) of the present invention, since the anti-unidirectional-drift controlling unit allows the cruise control operating unit to perform an anti-unidirectional-drift control during operation in which time the steering effort of the steering system by the driver tends to be weaker, shortage of the steering effort of the steering system by the driver can be timely compensated.

Moreover, a vehicle steering system (8) of the present invention accords to the vehicle steering system (1), wherein the anti-unidirectional-drift controlling unit increases control amount for the anti-unidirectional-drift control when the cruise control operating unit is operating for performing a cruise control of the vehicle, as compared to control amount for the anti-unidirectional-drift control when the cruise control operating unit is not operating.

In the vehicle steering system (8) according to the present invention, the vehicle steering system is assumed to have an aspect that the cruise control operating unit being in operation is not associated with the executability of the anti-unidirectional-drift control.

According to the vehicle steering system (8) of the present invention, since the anti-unidirectional-drift controlling unit increases the control amount for the anti-unidirectional-drift control when the cruise control operating unit is operating for performing the cruise control of the vehicle, as compared to the control amount for the anti-unidirectional-drift control when the cruise control operating unit is not operating, even if the cruise control operating unit becomes in operation while the anti-unidirectional-drift control is being performed, shortage of the steering effort of the steering system by the driver can be timely compensated. It is because if the cruise control operating unit is operating, as compared to a case where it is not operating, the steering effort of the steering system by the driver tends to be weaker.

Still further, a vehicle steering system (9) of the present invention accords to the vehicle steering system (1), wherein the anti-unidirectional-drift controlling unit increases the control amount, when the steering torque value is less than a predetermined threshold value, for the anti-unidirectional-drift control, assuming that constraint of the steering wheel in the steering system is released, as compared to the control amount for the anti-unidirectional-drift control when the steering torque value is equal to or greater than the predetermined threshold value.

According to the vehicle steering system (9) of the present invention, since the control amount for the anti-unidirectional-drift control is increased when the constraint of the steering wheel in the steering system is released, as compared to the control amount for the anti-unidirectional-drift control when the steering torque value is equal to or greater than the predetermined threshold value, even if the driver loosens gripping force of the steering handle while the anti-unidirectional-drift control is being performed, shortage of the steering effort of the steering system by the driver can be timely compensated.

Still further, a vehicle steering system (10) of the present invention accords to the vehicle steering system (1) and further includes a traveling environment detecting unit that detects whether or not the vehicle is traveling in a low visibility environment, wherein the anti-unidirectional-drift controlling unit decreases the control amount, when the vehicle is traveling in a low visibility environment, for the anti-unidirectional-drift control, as compared to the control amount for the anti-unidirectional-drift control when the vehicle is traveling in a high visibility environment.

It should be noted that decreasing the control amount for the anti-unidirectional-drift control includes stopping the anti-unidirectional-drift control (this also holds true hereinafter).

According to the vehicle steering system (10) of the present invention, since the anti-unidirectional-drift controlling unit decreases the control amount, when the vehicle is traveling in a poor visibility environment, for the anti-unidirectional-drift control, as compared to the control amount for the anti-unidirectional-drift control when the vehicle is traveling in a good visibility environment, the effect of retaining the comfort of steering feeling provided to the driver can be expected. If the vehicle is traveling in a poor visibility environment, it is difficult for the driver to recognize the inclination of a cant road, possibly causing an erratic driving. In such a case, decreasing the control amount for the anti-unidirectional-drift control is less likely to impair the comfort of steering feeling provided to the driver, as compared to the control amount for the anti-unidirectional-drift control when the vehicle is traveling in a good visibility environment.

Still further, a vehicle steering system (11) of the present invention accords to the vehicle steering system (1) and further includes a vehicle speed detecting unit that detects a vehicle speed, wherein the anti-unidirectional-drift controlling unit decreases the control amount, when the vehicle speed is less than a predetermined threshold value, for the anti-unidirectional-drift control, as compared to the control amount for the anti-unidirectional-drift control when the vehicle speed is equal to or greater than the predetermined threshold value.

According to the vehicle steering system (11) of the present invention, since the anti-unidirectional-drift controlling unit decreases the control amount, when the vehicle speed is less than the predetermined threshold value (e.g., 10 km/h), for the anti-unidirectional-drift control, as compared to the control amount for the anti-unidirectional-drift control when the vehicle speed is equal to or greater than the predetermined threshold value, an operating rate of the anti-unidirectional-drift control can be reduced and moderated when the vehicle speed is less than the predetermined threshold value, in which case the unidirectional-drift behavior of the vehicle less likely occurs.

Still further, a vehicle steering system (12) of the present invention accords to the vehicle steering system (1), wherein the anti-unidirectional-drift controlling unit decreases the control amount, when the vehicle is turning left or right, for the anti-unidirectional-drift control, as compared to the control amount for the anti-unidirectional-drift control when the vehicle is traveling straight.

According to the vehicle steering system (12) of the present invention, since the anti-unidirectional-drift controlling unit decreases the control amount, when the vehicle is turning left or right, for the anti-unidirectional-drift control, as compared to the control amount for the anti-unidirectional-drift control when the vehicle is traveling straight, an operating rate of the anti-unidirectional-drift control can be reduced and moderated when the vehicle is turning left or right, in which case the unidirectional-drift behavior of the vehicle less likely occurs.

Still further, a vehicle steering system (13) of the present invention accords to the vehicle system (1) and further includes a vehicle behavior stabilization controlling unit that performs a vehicle behavior stabilization control to stabilize the behavior of the vehicle, wherein the anti-unidirectional-drift controlling unit decreases the control amount, when the vehicle behavior stabilization control is performed, for the anti-unidirectional-drift control, as compared to the control amount for the anti-unidirectional-drift control when the vehicle behavior stabilization control is not performed.

According to the vehicle steering system (13) of the present invention, since the anti-unidirectional-drift controlling unit decreases the control amount, when the vehicle behavior stabilization control is performed, for the anti-unidirectional-drift control, as compared to the control amount for the anti-unidirectional-drift control when the vehicle behavior stabilization control is not performed, an operating rate of the anti-unidirectional-drift control can be reduced and moderated when the vehicle behavior stabilization control is performed, in which case the unidirectional-drift behavior of the vehicle less likely occurs.

Still further, the vehicle steering system (14) of the present invention accords to the vehicle steering system (1) and further includes a bypass assist controlling unit that performs a bypass assist control to assist a bypass operation with respect to an obstacle around the vehicle, wherein the anti-unidirectional-drift controlling unit decreases the control amount, when the bypass assist control is performed, for the anti-unidirectional-drift control, as compared to the control amount for the anti-unidirectional-drift control when the bypass assist control is not performed.

According to the vehicle steering system (14) of the present invention, since the anti-unidirectional-drift controlling unit decreases the control amount, when the bypass assist control is performed, for the anti-unidirectional-drift control, as compared to the control amount for the anti-unidirectional-drift control when the bypass assist control is not performed, an operating rate of the anti-unidirectional-drift control can be reduced and moderated when the bypass assist control is performed, in which case the unidirectional-drift behavior of the vehicle less likely occurs.

Still further, the vehicle steering system (15) of the present invention accords to the vehicle steering system (1) and further includes a lane-keeping assist controlling unit that performs a lane-keeping assist control to help the vehicle keep a lane, wherein the anti-unidirectional-drift controlling unit decreases the control amount, when the lane-keeping assist control is performed, for the anti-unidirectional-drift control, as compared to the control amount for the anti-unidirectional-drift control when the lane-keeping assist control is not performed.

According to the vehicle steering system (15) of the present invention, since the anti-unidirectional-drift controlling unit decreases the control amount, when the lane-keeping assist control is performed, for the anti-unidirectional-drift control, as compared to the control amount for the anti-unidirectional-drift control when the lane-keeping assist control is not performed, an operating rate of the anti-unidirectional-drift control can be reduced and moderated when the lane-keeping assist control is performed, in which case the unidirectional-drift behavior of the vehicle less likely occurs.

Advantageous Effects of the Invention

According to the present invention, even in a situation, such as traveling on a cant road or in a crosswind, where a unidirectional drift behavior of a vehicle occurs, a vehicle steering system can be provided that is capable of retaining the comfort of steering feeling provided to the driver.

BRIEF DESCRIPTION OF DRAWINGS

FIG. 6A is a diagram showing a relationship between external force applied to the vehicle and a steering operation by the driver.

FIG. 6B is a diagram showing that an inclination of a cant road is different by lane.

FIG. 7A is a flow chart simply showing cooperation between a cruise control and an anti-unidirectional-drift control according to the first embodiment of the present invention.

FIG. 7B is a time chart of the anti-unidirectional-drift control schematically showing a temporal transition of the position of a cruise control switch.

FIG. 7C is a time chart of the anti-unidirectional-drift control schematically showing temporal changes of an actual steering angle.

FIG. 7D is a time chart of the anti-unidirectional-drift control schematically showing temporal changes of an anti-unidirectional-drift steering angle having an initial value of the steering angle θ at time t2.

FIG. 7E is a time chart of the anti-unidirectional-drift control schematically showing temporal changes of an anti-unidirectional-drift steering angle having an initial value of zero steering angle at time t2.

EMBODIMENTS OF THE INVENTION

Next, a description will be given in detail of a plurality of modes to implement the present invention, with reference to accompanying drawings.

First Embodiment

Overall Configuration

Figure 1:
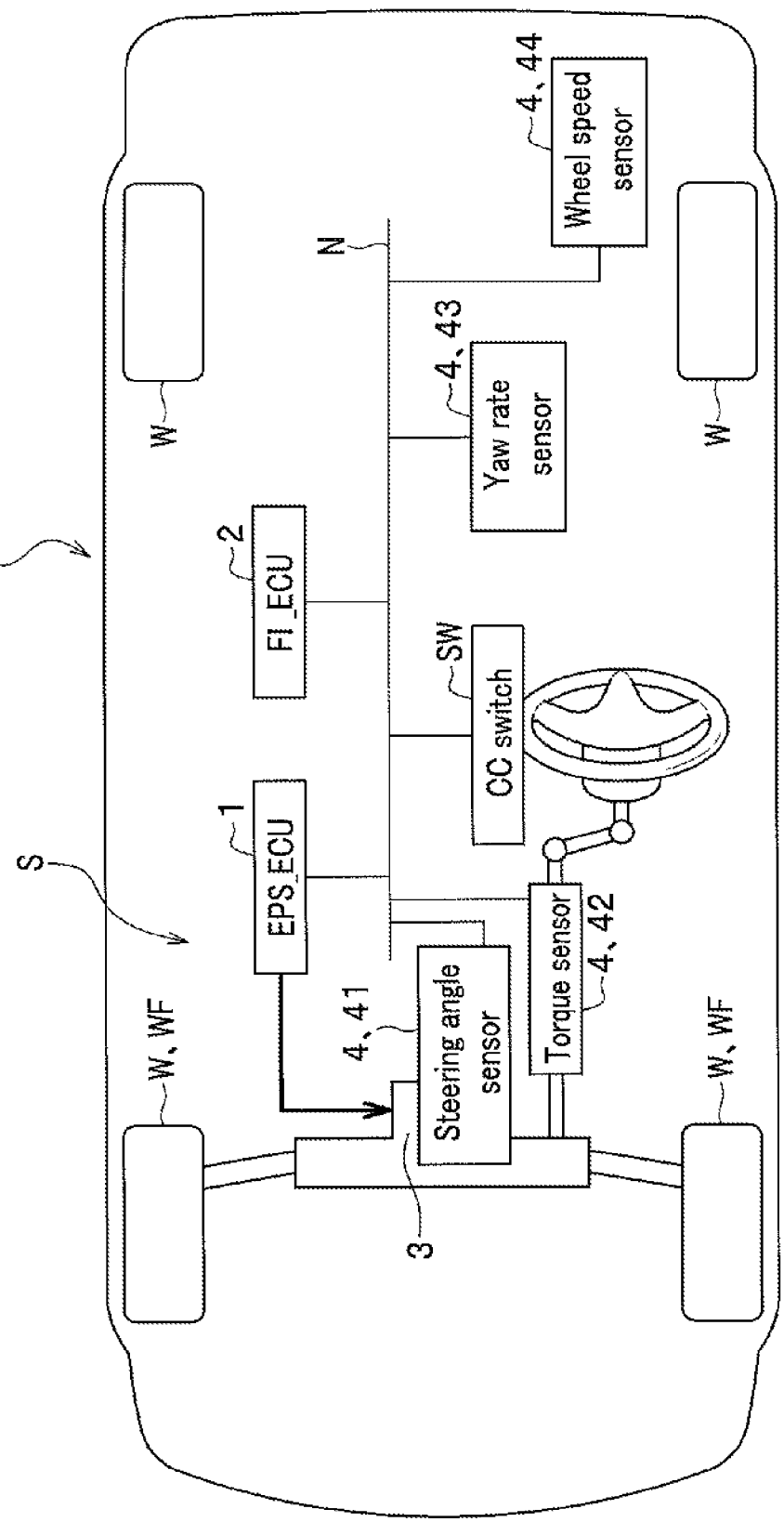
FIG. 1 is a schematic view showing the entire configuration of a vehicle equipped with a vehicle steering system according to the present invention.

FIG. 1 is a diagram schematically showing the overall configuration of a vehicle C equipped with a vehicle steering system S according to embodiments of the present invention. As shown in FIG. 1, the vehicle C is a four-wheeled vehicle that includes an internal combustion engine (not shown) and four wheels W. Wheels WF show steerable wheels. The vehicle steering system S is installed in the vehicle C and configured with an electric power steering system including an EPS_ECU 1 that is an ECU (Electronic Control Unit) for controlling electric power steering (EPS) and an electric motor 3 for steering. This electric power steering system is a well-known system for providing assist by driving the motor 3 so as to relieve a steering effort of the driver required for steering the wheels W. In addition, the vehicle C includes an FI_ECU 2 that is an ECU for controlling fuel injection (FI).

The EPS_ECU 1 is connected with various sensors 4, including a steering angle sensor 41, a steering torque sensor 42, yaw rate sensor 43, and a wheel speed sensor 44, and a cruise control switch SW.

The steering angle sensor 41 is a member corresponding to the "steering angle detecting unit" of the present invention. In the present embodiment, the steering angle sensor 41 is substituted with an angle sensor for measuring a rotation angle of the electric motor 3. The steering angle sensor 41 detects, in addition to a steering angle of the steering wheel H, a rotation speed of the electric motor 3 (or motor rotation speed), and this is substantially equal to a steering speed).

The steering torque sensor 42 (referred to as a "torque sensor" in FIG. 1) is a member corresponding to the "steering torque detecting unit" of the present invention. The steering torque sensor 42 detects a steering torque (manual steering effort) that is inputted by the driver through the steering wheel H.

The yaw rate sensor 43 detects a yaw rate (turning angle) of the vehicle C.

The wheel speed sensor 44 is a member for detecting a rotation speed of the wheel W as a wheel speed pulse signal. In FIG. 1, the wheel speed sensor 44 is provided only for a single wheel W, but actually provided for each of the four wheels W.

Incidentally, the vehicle speed can be calculated by taking an average of the detected values of the wheel speed sensors 44 that are respectively provided to the four wheels W, or taking an average of the detected values of the wheel speed sensors 44 that are respectively provided to two driven wheels W.

The cruise control switch SW (hereinafter, "cruise control" will be sometimes abbreviated as "CC") is a member that is turned on by the driver when the vehicle is traveling on a freeway or the like under a constant speed control. In FIG. 1, the cruise control switch is referred to as a "CC switch." The CC switch SW is, for example, provided at or near the steering wheel H.

The CC switch SW is released (turned off) when one of predetermined conditions, such as depression of a brake pedal by the driver, is satisfied.

In FIG. 1, the EPS_ECU 1, the FI_ECU 2, each of the sensors 4, the CC switch SW, and the like are connected to one another via a communication medium N such as a CAN (Control Area Network).

Figure 2:
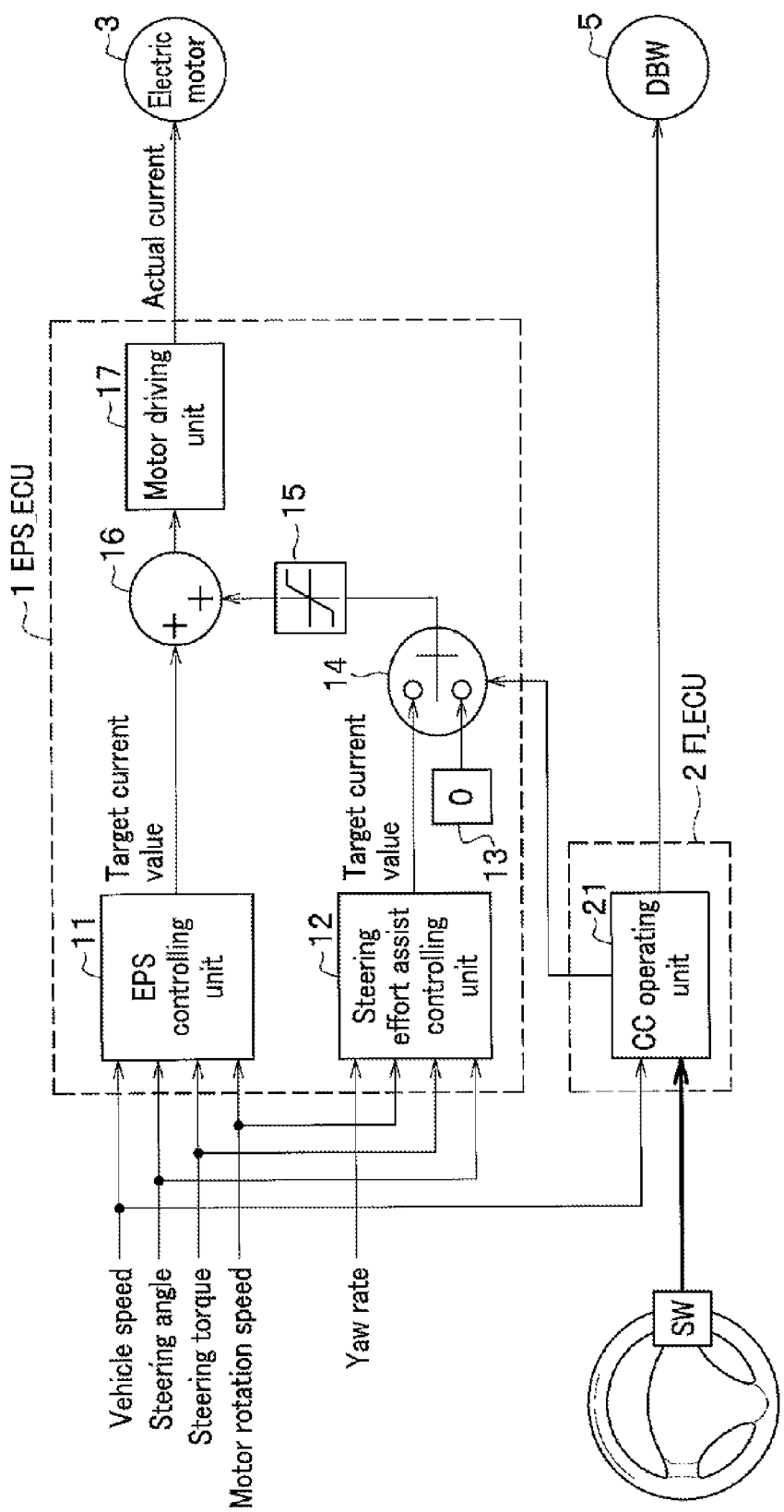
FIG. 2 is a block diagram illustrating a schematic configuration of the vehicle steering system according to a first embodiment of the present invention.

FIG. 2 is a block diagram showing a schematic configuration of the EPS_ECU 1 and the FI_ECU 2 in the vehicle C in FIG. 1, and a cooperative relationship between the two.

[EPS_ECU 1]

As shown in FIG. 2, the EPS_ECU 1 has features for performing a driving control over the electric motor 3 for EPS. The EPS_ECU 1 is configured with an EPS controlling unit 11, a steering effort assist controlling unit 12 that corresponds to the "anti-unidirectional-drift controlling unit" of the present invention, a zero-current-value outputting unit 13, a switching unit 14, a limiter 15, an adder 16, and a motor driving unit 17.

Incidentally, in the EPS_ECU 1, the steering effort assist controlling unit 12, the zero-current-value outputting unit 13, the switching unit 14, the limiter 15, and the adder 16 are features of the embodiments according to the present invention.

The EPS controlling unit 11 has a feature that creates a target current value for driving the electric motor 3, based on various parameters including a speed of the vehicle C (vehicle speed), a steering angle of the steering wheel H, a steering torque, and the rotation speed (steering speed) of the electric motor 3.

The steering effort assist controlling unit 12 has a feature of performing, in a situation, such as on a cant road, where the unidirectional drift behavior of the vehicle C occurs, the "anti-unidirectional-drift control" with which the target current value is outputted to the switch 14 in the subsequent stage for canceling the unidirectional drift. Detailed information about the steering effort assist controlling unit 12 will be described later with reference to FIG. 3.

The zero-current-value outputting unit 13 has a feature of outputting the zero current value, which is supplied to the adder 16, to the switch 14 in the subsequent stage.

Based on a CC state signal (CC-in-operation flag) from the cruise control operating unit (CC operating unit) 21, the switch 14 has a feature of outputting the target anti-unidirectional-drift current value from the steering effort assist controlling unit 12 to the limiter 15 in the subsequent stage when the CC switch SW is ON, while outputting the zero current value from the zero current outputting unit 13 to the limiter 15 in the subsequent stage when the CC switch SW is OFF.

The limiter 15 has a feature of limiting an absolute value of the current value outputted from the switch 14 so as not to exceed a predetermined limit value. In particular, the limiter 15 limits, for example when the CC switch SW is ON, the absolute value of the target anti-unidirectional-drift current value outputted from the steering effort assist controlling unit 12 so as not to exceed a predetermined limit value.

Here, the limiter 15 will be described in more detail. Suppose that the limiter 15 is omitted to connect the switch 14 and the adder 16 directly. In this case, the adder 16 is inputted with the output signal from the switch 14 as it is. The output signal from the switch 14 includes an output signal of the target anti-unidirectional-drift current value from the steering effort assist controlling unit 12. The target anti-unidirectional-drift current value is generated in the steering effort assist controlling unit 12 to cancel the unidirectional drift. If a great unidirectional drift behavior occurs to the vehicle C, the target anti-unidirectional-drift current value can become an excessive value in order to cancel this great unidirectional drift behavior.

Then, the target anti-unidirectional-drift current value having the excessive value is inputted to the adder 16. The motor driving unit 17 drives the electric motor 3 based on the excessive target anti-unidirectional-drift current value outputted from the adder 16. That is, in EPS_ECU 1, an anti-unidirectional-drift control is performed that causes a movement of the midpoint beyond the true moving amount. As a result, a problem has occurred that a control over the steering effort cannot be performed appropriately.

Therefore, the limiter 15 has been added between the switch 14 and the adder 16, and additionally a current limit value has been designed to be set within a range that does not exceed a maximum control amount for the anti-unidirectional-drift control.

With such a configuration, the anti-unidirectional-drift control can be suppressed that causes a movement of the midpoint beyond the true moving amount, and then a control over the steering effort can be performed appropriately.

The adder 16 has a feature of adding the anti-unidirectional-drift current value outputted from the limiter 15 to the target current value outputted from the EPS controlling unit 11. Specifically, the adder 16 has a feature, if the CC switch SW is ON, of adding the target anti-unidirectional-drift current value outputted from the steering effort assist controlling unit 12 to the target current value outputted from the EPS controlling unit 11, to output the result to the motor driving unit 17.

The motor driving unit 17 includes a processing unit (not shown) and an inverter. The motor driving unit 17 has a feature of generating a PWM (Pulse Width Modulation) signal based on the target current value outputted from the adder 16 after a process of addition, and using this PWM signal to drive an inverter for generating a three-phase alternating current to be supplied to the electric motor 3, thereby causing the electric motor 3 to PWM-drive.

[FI_ECU]

The FI_ECU 2 is an ECU that dictates controls such as over ignition timing and fuel injection amount, as shown in FIG. 2. The FI_ECU 2 mounted on the vehicle C includes a CC operating unit 21. The CC operating unit 21 of the FI_ECU 2 has a function of performing a control to allow the vehicle C to travel at a constant speed that is appropriately set by performing a position adjustment of DBW (Drive-By-Wire) valve 5. In addition, the CC operating unit 21 outputs a signal (CC-in-operation flag) to the switch 14 when the CC switch SW provided on the steering wheel H is ON, allowing the switch 14 to output the target anti-unidirectional-drift current value outputted from the steering effort assist controlling unit 12 to the limiter 15 in the subsequent stage.

Further, when the CC switch SW is turned on, the CC operating unit 21 controls the output of the engine through the DBW (Drive-By-Wire) valve 5 to allow the vehicle C to travel at a constant speed. This CC processing feature allows the vehicle C to travel at a constant speed without the driver performing an acceleration work (even taking his/her foot off the accelerator pedal), for example, in a long straight road without a signal.

Cooperation between the CC operating unit 21 and the switch 14 is implemented as follows. That is, if the CC switch SW is ON, it is assumed that such a situation would more likely to occur where the anti-unidirectional-drift control (steering effort assist control) is performed, and the switch 14 is switched to the steering effort assist control unit 12 to enable the anti-unidirectional-drift control. On the other hand, if the CC switch SW is OFF, it is assumed that there will be no large steering and such a situation would less likely to occur where the anti-unidirectional-drift control disturbs the comfort of the driver, and the switch 14 is switched to the zero-current outputting unit 13 to disable the anti-unidirectional-drift control.

[Steering Effort Assist Controlling Unit]

Next, a description will be given in detail of the steering effort assist controlling unit 12 with reference primarily to FIG. 3 which is a block diagram showing the internal configuration.

Figure 3:
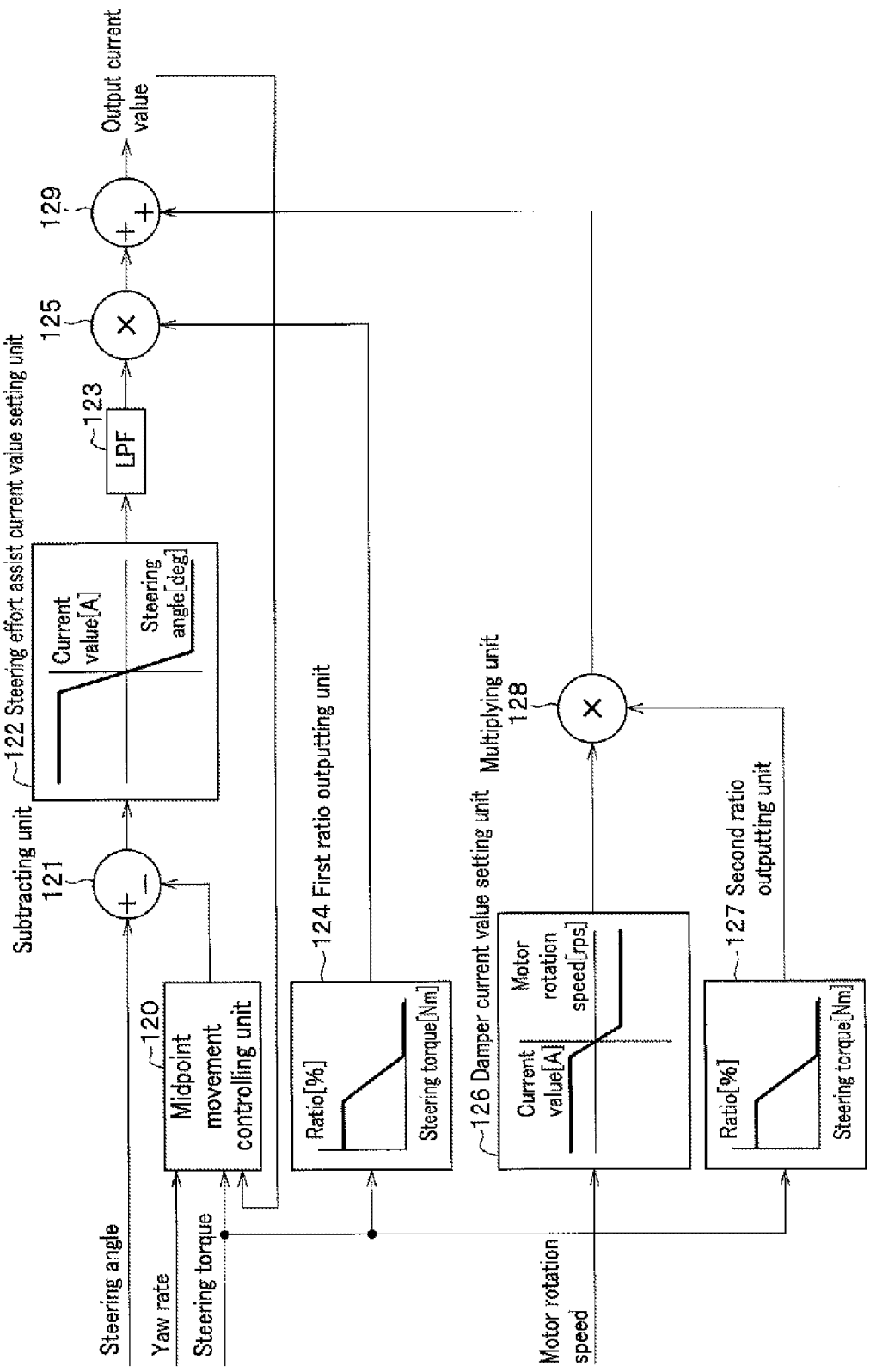
FIG. 3 is a block diagram showing the internal configuration of a steering effort assist controlling unit shown in FIG. 2.

As shown in FIG. 3, the steering effort assist controlling unit 12 includes a midpoint movement controlling unit 120, a subtracting unit 121, a steering effort assist current value setting unit 122, a low-pass filter (LPF) 123, a first ratio outputting unit 124, a multiplying unit 125, a damper current value setting unit 126, a second ratio outputting unit 127, a multiplying unit 128, and an adding unit 129.

Incidentally, the steering effort assist controlling unit 12 in this embodiment has a feature of outputting the target current value (base current value for anti unidirectional drift) so as to suppress the movement of the electric motor 3 against an external force, such as a cant road or a crosswind, that causes a unidirectional drift behavior of the vehicle C.

The midpoint movement controlling unit 120 has a feature of inputting a yaw rate, a steering torque, and an output current value from the steering effort assist controlling unit 12, and when the integrated value of the steering torque (integrated torque value) exceeds a threshold value (midpoint movement determination threshold), for example, outputting an anti-unidirectional-drift steering angle value based on the anti-unidirectional-drift behavior. For this midpoint movement controlling section 120, a description will be given later in detail with reference to FIG. 4.

Incidentally, the initial value of the anti-unidirectional-drift steering angle value may be set to, for example, 0 degree. The initial value of the anti-unidirectional-drift steering angle value may be set, for example, when the steering angle of the steering wheel H is less than a predetermined steering angle threshold value, to a steering angle of the steering wheel H at that time. Alternatively, the initial value may be set to 0 degree when the steering angle of the steering wheel H is equal to or greater than a predetermined steering angle threshold value or the yaw rate is equal to or greater than a predetermined yaw rate threshold value. Specifically, as for the initial value of the anti-unidirectional-drift steering angle value, the magnitude of the value may be set as appropriate, for example, based on an analysis result obtained, such as from experiments and simulations.

The subtracting unit 121 has a feature of subtracting the anti-unidirectional-drift steering angle value, which is outputted from the midpoint movement controlling section 120, from the reference of the initial value of the anti-unidirectional-drift steering angle value (0 degree or current steering angle of the steering wheel H inputted from the steering angle sensor 41).

The steering effort assist current value setting unit 122 has a feature of converting the anti-unidirectional-drift steering angle value inputted from the subtracting unit 121 to a current value (base current value), based on mapping information (set in advance) of the current value relative to the change of the anti-unidirectional-drift steering angle value. Note that the mapping information of the current value relative to the anti-unidirectional-drift steering angle value is set to have characteristics in which the absolute value of the base current value increases as the absolute value of the steering angle increases. It is because the driver attempts to increase the steering angle to make a steering effort as a tendency of the unidirectional drift increases, in order to cancel this tendency.

In addition, the mapping information of the current value relative to the anti-unidirectional-drift steering angle value is set to have characteristics in which the electric motor 3 is supplied with such a current that suppresses motion of the electric motor 3 against a force causing a unidirectional drift behavior to the vehicle C. It is because the suppression of motion of the electric motor 3 leads to suppression of the movement of the steering wheel H, which in turn reduces the physical burden of the driver for making a steering effort on the steering wheel H.

In a graph shown in the steering effort assist current value setting unit 122 in FIG. 3, steering angles rightward from the center of the horizontal axis are indicated by negative values, while steering angles leftward are indicated by positive values. For example, when a steering angle has a positive value, a current value is set to a negative value. On the other hand, when a steering angle has a negative value, a current value is set to a positive value.

Note that the mapping information of the current value relative to the anti-unidirectional-drift steering angle value set for the steering effort assist current value setting unit 122 is set to have characteristics in which current values are either raised or lowered sharply at a boundary of the initial value (0 degree in an example in FIG. 3) of the anti-unidirectional-drift steering angle value. If the mapping information of the current value relative to the anti-unidirectional-drift steering angle value is set to have such characteristics, a sense of returning to the reference position can be provided to the steering angle of the steering wheel H near the initial value of the anti-unidirectional-drift steering angle value. In the following description, a steering angle of the steering wheel H that works as a reference when the vehicle C travels straight will be referred to as a midpoint steering angle (sometimes simply abbreviated as "midpoint"). This midpoint can be changed according to a driving environment of the vehicle C (a flat straight road or a cant road), and will be described later in detail. The wording "midpoint of the steering system" herein refers to the midpoint steering angle (midpoint) of the steering wheel H.

Note that in the EPS controlling unit 11, a concept of the base current value, the damper current value, and the like also exists as in the case of the steering effort assist controlling unit 12. However, whereas the base current value and the damper current value in the steering effort assist controlling unit 12 belong to a concept that is used to perform the anti-unidirectional-drift control aiming for the steering effort assist, the base current value and the damper current value in the EPS controlling unit 11 belong to a concept that is used to perform the torque assist control of the steering. Thus, it should be remarked that the base current value and the damper current value in the steering effort assist controlling unit 12, and those in the EPS controlling unit 11 are different from each other at the concept level.

The low-pass filter 123 has a feature, for example, by performing a time-shift averaging process for the base current value outputted from the steering effort assist current value setting unit 122, of damping the temporal transition characteristics of the base current value. However, the low-pass filter 123 can be omitted by appropriately adjusting the mapping information of the current value relative to the anti-unidirectional-drift steering angle value, which information is set in the steering effort assist current value setting unit 122.

Here, the low-pass filter 123 will be described in more detail. Suppose that the low-pass filter 123 is provided in a prior stage of the steering effort assist current value setting unit 122. In this case, the low-pass filter 123 is inputted with the steering angle signal detected by the steering angle sensor 41. On this occasion, a cutoff frequency of the low-pass filter 123 is generally set to a relatively low frequency. It is because the reliability of the control can be guaranteed by reducing (this includes removing and attenuating) high-frequency noises contained in the steering angle signal.

However, as described above, setting the cutoff frequency of the low-pass filter 123 relatively low causes a problem as follows. That is, for example, there is a case where temporal characteristics of the steering angle signal change rapidly as a result of a quick steering by the driver such as when traveling on a winding road or when making a lane change. At this time, if the cutoff frequency of the low-pass filter 123 is set relatively low, since the responsiveness of the detection signal to the quick change of the steering angle is deteriorated, the responsiveness of the anti-unidirectional-drift control to the quick change of the steering angle is impaired.

Further, contrary to the above, if the cutoff frequency of the low-pass filter 123 is set relatively high, high frequency noises contained in the steering angle signal are now removed insufficiently and then reliability of the anti-unidirectional-drift control is impaired in a way such that the anti-unidirectional-drift control is performed, even when traveling straight on a flat road, in a situation where the control is unnecessary in nature.

Then, the low-pass filter 123 has been designed to be provided in the subsequent stage of the steering effort assist current value setting unit 122, and further the cutoff frequency of the low-pass filter 123 has been set relatively high.

With this configuration, both the reliability and responsiveness of the anti-unidirectional-drift control can be achieved. Also, an effect of securing the degree of freedom can be expected for setting the cutoff frequency of the low-pass filter 123.

The first ratio outputting unit 124 has a feature of converting a steering torque inputted from the steering torque sensor 42 to a first ratio, based on mapping information of the first ratio relative to a change in the steering torque (set in advance). Here, the first ratio is a correction coefficient for appropriately correcting the base current value outputted from the low-pass filter 123 in consideration of the magnitude of the steering torque.

The mapping information of the first ratio relative to the change in the steering torque is set to have characteristics in which values of the first ratio are substantially constant positive values in a region where the steering torque has predetermined small values, become smaller as the value of the steering torque becomes larger out of the region where the steering torque has predetermined small values, and becomes zero in a region where the steering torque has predetermined large values. This is because when the driver performs a left or right turn of the vehicle C, a lane change, or steering for an operation to bypass an obstacle (belongs to the area where the values of the steering torque are large, as described above), correcting the target anti-unidirectional-drift current value small is considered to be preferable from the viewpoint of not disturbing the steering by the driver.

The multiplying unit 125 has a feature of performing a correction to the base current value, considering the magnitude of the steering torque, by performing an operation of multiplying the first ratio outputted from the first ratio outputting unit 124 to the base current value on which a high-frequency component removal operation has been performed by the low-pass filter 123.

The damper current value setting unit 126 has a feature of converting the rotation speed of the electric motor inputted, based on (preset) mapping information of the damper current relative to the change in the rotation speed of the electric motor. Here, the damper current value is a correction coefficient for correcting the base current value as appropriate for driving the electric motor 3, in consideration of the magnitude of the motor rotation speed of the electric motor.

The mapping information of the damper current value relative to the change in the rotation speed of the electric motor is set to have characteristics in which the current value linearly increases or decreases when the rotation speed of the electric motor stays within a low-speed region inclusive of zero, and has a substantially constant current value in each rotational direction when the rotation speed of the electric motor goes out of the low-speed region. It is because supplying the electric motor 3 a current, which has characteristics of suppressing, as the electric motor 3 changes its speed rapidly, its rapid change, suppresses the rapid change to increase the stability of the steering effort on the steering wheel H. Note that the information about the rotation speed of the electric motor may be obtained from the rotational speed sensor such as a resolver provided in the electric motor 3, or may be obtained based on the differential time value of the steering angle from the steering angle sensor 41.

Here, the damper current value set by the damper current value setting unit 126, and the damper current value set by the EPS controlling unit 11 are different in the following points. That is, the damper current value set by the EPS control unit 11 is intended to prevent the fluctuation of the steering wheel H when the vehicle C is traveling at a high speed, to give the driver a feeling of stable steering. On the other hand, the damper current value set by the damper current value setting unit 126 is intended to cancel the unidirectional drift behavior.

The second ratio output unit 127 has a feature of converting the steering torque inputted from the steering torque sensor 42 to the second ratio, based on (preset) mapping information of the second ratio relative to the change in the steering torque. Here, the second ratio is a correction coefficient for correcting the damper current value outputted from the damper current value setting unit 126 as appropriate, in consideration of the magnitude of the steering torque.

The mapping information of the second ratio relative to the steering torque is set, as in the case of the mapping information of the first ratio relative to the steering torque, to have characteristics in which a value of the second ratio is positive and substantially constant when the value of the steering torque falls in a predetermined small-value region, becomes smaller as the value of the steering torque increases beyond the small-value region, and becomes zero when the value of the steering torque falls in a predetermined large-value region. This is because, when the driver performs a left or right turn of the vehicle C, a lane change, or a steering associated with an operation to bypass an obstacle (the value of the steering torque falls in the large-value region), correcting the damper current value by small amount is considered to be preferable from a viewpoint of not interfering with the steering of the driver.

The multiplying unit 128 has a feature of correcting the damper current value, in consideration of the magnitude of the steering torque, by performing an operation to multiply the damper current value outputted from the damper current value setting unit 126 by the second ratio outputted from the second ratio outputting unit 127.

The adding unit 129 has a feature of correcting a base current value in consideration of the magnitude of the damper current value, by performing an operation to add the damper current value outputted from the multiplying unit 128 to the base current value outputted from the multiplying unit 125. The adding unit 129 outputs the base current value after the correction as the target anti-unidirectional-drift current value.

In the present embodiment, as shown in FIG. 2, the target anti-unidirectional-drift current value is added in the adder 16 when the CC-in-operation flag is ON which indicates that the cruise control operation in the CC operating unit 21 of the FI_ECU 2 is operating, to the target current value outputted from the EPS controlling unit 11 (target current value in the EPS control). The motor driving unit 17 drives the electric motor 3 so that a current supplied from a battery power source (not shown) follows the target current value after the addition.

[Midpoint Movement Controlling Unit]

Figure 4:
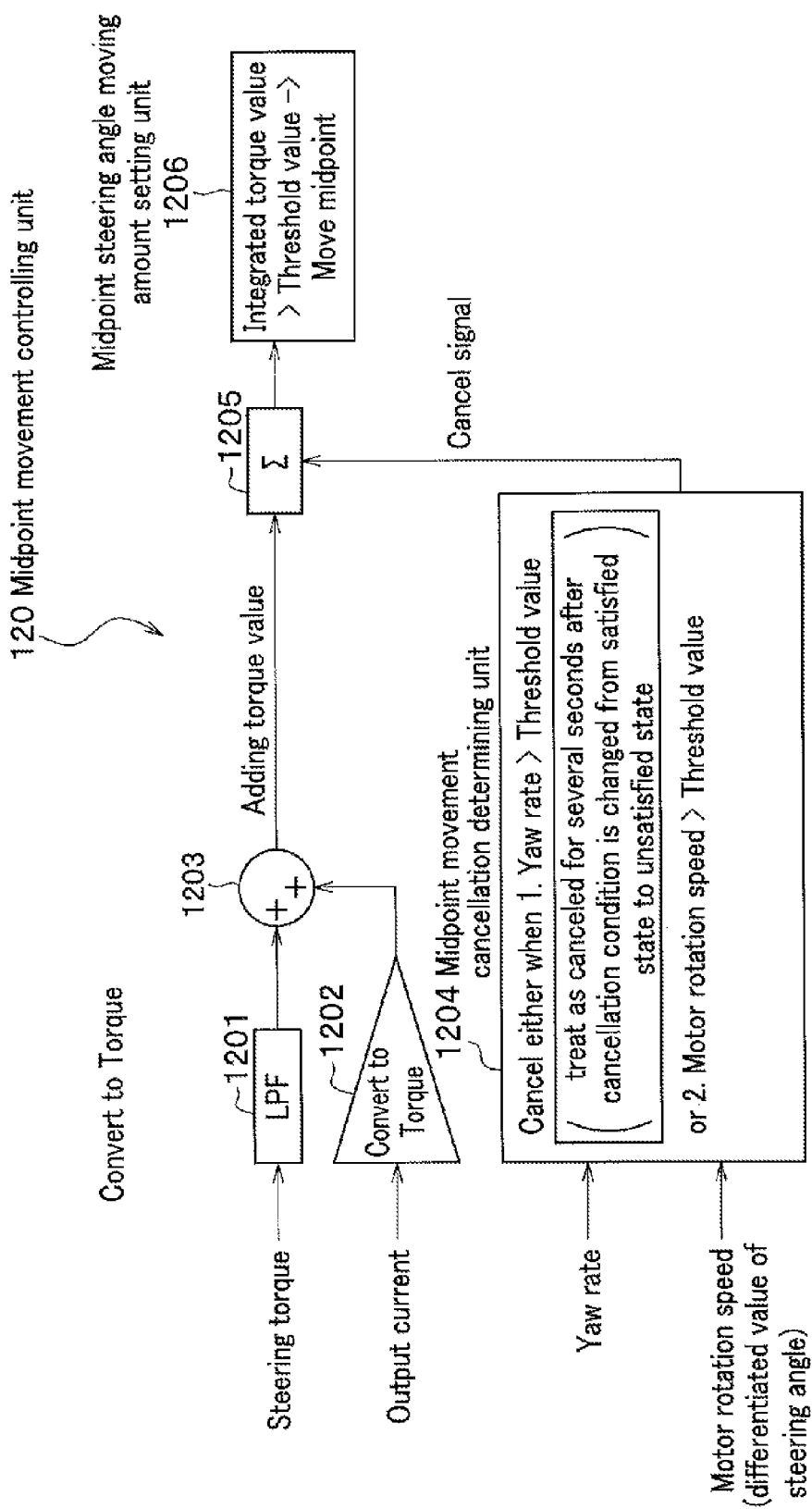
FIG. 4 is a block diagram showing the internal configuration of the midpoint movement controlling unit shown in FIG. 3.

Next, a description will be given of an internal configuration of the midpoint movement controlling unit 120, mainly with reference to FIG. 4. FIG. 4 is a block diagram showing the internal configuration of the midpoint movement controlling unit 120.

As shown in FIG. 4, the midpoint movement controlling unit 120 includes a low-pass filter (LPF) 1201, a torque converting unit 1202, an adding torque calculating unit 1203, a midpoint movement cancellation determining unit 1204, an integrating unit 1205, and a midpoint steering angle moving amount setting unit 1206.

The low-pass filter 1201 has a feature of removing high-frequency components in the steering torque signals outputted from the steering torque sensor 42 every moment, and outputting the steering torque signals after removal, which mainly contain low-frequency components, to the adding torque calculating unit 1203 in the subsequent stage. The low-pass filter 1201 removes the high-frequency components in the steering torque signals due to road surface irregularities, and outputs only the steering torque signals which mainly contain the low-frequency components at the time of doing steering efforts on the cant road.

The torque converting unit 1202 has a feature of feedback-inputting the base current value outputted from the steering effort assist controlling unit 12 (input current value to the electric motor 3), converting the base current value to the steering torque by multiplying the base current value by a predetermined conversion factor, and outputting this converted steering torque to the adding torque calculating unit 1203 in the subsequent stage.

The adding torque calculating unit 1203 has a feature of calculating the adding torque by adding the torque, which has been converted from the current value outputted from the steering effort assist controlling unit 12 and outputted from the torque converting unit 1202, to the steering torque outputted from the low-pass filter 1201, and outputting the adding torque calculated to the integrating unit 1205 in the subsequent stage. The adding torque calculating unit 1203 can increase the integrated torque value at an early timing to allow the midpoint steering angle of the steering wheel H (midpoint of the steering system) to quickly move to the target anti-unidirectional-drift steering angle value. Note that performing the unidirectional drift control involving the movement of the midpoint will gradually decrease the steering torque for cancelling the unidirectional drift behavior according to the operation of the electric motor 3. As a result, the adding torque is directed to converge to zero.

The midpoint movement cancellation determining unit 1204 has a feature of generating a cancellation signal that indicates to cancel the movement of the midpoint, either when the yaw rate detected by the yaw rate sensor 43 exceeds a predetermined threshold value or the rotation speed of the electric motor exceeds a predetermined threshold value, assuming that a cancel condition has been satisfied for canceling the movement of the midpoint, and outputting the cancellation signal to the integrating unit 1205 in the subsequent stage.

More specifically, the midpoint movement cancellation determining unit 1204 operates to continuously output the cancellation signal to the integrating unit 1205, during a transition period of the vehicle C from a state of turning to a state of traveling straight, until a predetermined wait time (changeable as appropriate: e.g., several seconds) elapses after the yaw rate becomes less than or equal to a predetermined threshold value, as in a case while turning (the yaw rate exceeds the predetermined threshold value). Thus, the midpoint movement cancellation determining unit 1204 disables the movement of the midpoint during the transition period.

In other words, in a situation where the midpoint movement cancellation determining unit 1204 is outputting the cancellation signal because the cancel condition has been satisfied, if the cancel condition changes to an unsatisfied state, the midpoint movement cancellation determining unit 1204 does not stop outputting the cancellation signal immediately, and operates to continuously output the cancellation signal until the predetermined wait time elapses, assuming that the cancel condition is satisfied.

The reason is as follows. That is, in the transition period, the value of the steering torque detected by the steering torque sensor 42 tends to be disturbed under the influence of the posture change of the vehicle C, to contain an error. Then, the integrated value of the adding torque (integrated torque value) in the integrating unit 1205 also tends to contain an error. As a result, validity of the timing of moving the midpoint is impaired, and comfort of steering feeling provided to the driver might be impaired. Specifically, for example, when the vehicle C is traveling on a cant road, the driver operates the steering handle H so that the steering angle matches the inclination of the cant road, but if the anti-unidirectional-drift control is turned on before the operation, the driver may feel discomfort about steering.

In the midpoint movement cancellation determining unit 1204, a determination is made whether the yaw rate exceeds a predetermined threshold value, or the rotational speed of the electric motor exceeds a predetermined threshold value. This has the same meaning as determining whether or not the vehicle C is traveling straight. It is because a case where the yaw rate is less than or equal to a predetermined threshold value, or the rotational speed of the electric motor is less than or equal to a predetermined threshold value is a behavior that appears when the vehicle C is traveling straight. The midpoint movement cancellation determining unit 1204 corresponds to "state-of-traveling-straight determining unit" of the present invention.

In short, the midpoint movement cancellation determining unit 1204 operates, when a determination is made that the vehicle C is not traveling straight, so as to generate a cancellation signal for canceling the movement of the midpoint.

The integrating unit 1205 has a feature of integrating, at a predetermined sampling rate, the adding torque outputted from the adding torque calculating unit 1203 every moment to obtain the integrated torque value, and outputting the integrated torque value obtained to the midpoint steering angle moving amount setting unit 1206 in the subsequent stage. In addition, the integrating unit 1205 has a feature of clearing the integrated torque value to zero if a cancellation signal is inputted from the midpoint movement cancellation determining unit 1204.

For example, if the movement of the midpoint is canceled because the vehicle C is turning (the yaw rate exceeds the predetermined threshold value), the movement of the midpoint is canceled in a state where the anti-unidirectional-drift steering angle value just before the turning is kept. Even when the vehicle C is turning, the base current value according to the anti-unidirectional-drift steering angle value just before the turning is continuously outputted to the electric motor 3.

Also, for example, if the vehicle C has started turning when the anti-unidirectional-drift steering angle value has a certain value (e.g., 3 degree), the turning is performed in a state where the certain value (3 degree) is kept. During the turning of the vehicle C, the anti-unidirectional-drift steering angle value remains unchanged. When the turning of the vehicle C has been completed, moving the midpoint is performed after the predetermined wait time elapses further from the completion time.

The anti-unidirectional-drift steering angle value is reset, for example, when the ignition switch is turned on or off. If the anti-unidirectional-drift control works with the cruise control, the anti-unidirectional-drift steering angle value is also reset when the CC switch SW is turned on or off.

The midpoint steering angle moving amount setting unit 1206 has a feature of determining whether or not the integrated torque value outputted from the integrating unit 1205 every moment exceeds a predetermined midpoint movement determination threshold value, setting the movement amount based on the integrated torque value, when the integrated torque value exceeds the midpoint movement determination threshold value, for moving the midpoint steering angle of the steering wheel H to the target anti-unidirectional-drift steering angle value, and outputting a control signal indicates to move the midpoint with the movement amount, as an output from the midpoint movement controlling unit 120, to the subtracting unit 121 (see FIG. 3).

Thus, in the midpoint movement controlling unit 120, a torque converted from the current value outputted from the steering effort assist controlling unit 12 is added to the steering torque signal from which high-frequency components are removed, and the movement amount is set, based on the integrated torque value obtained by temporally integrating the added torque value, for moving the midpoint steering angle of the steering wheel H to the target anti-unidirectional-drift steering angle value, thereby allowing the condition of moving the midpoint steering angle to be satisfied easily, to quickly respond to the unidirectional drift behavior.

[Operation]

Hereinabove, a description has been given of the overall configuration and the configuration of each unit of the vehicle C on which the vehicle steering system S according to the first embodiment of the present invention is mounted. Next, a description will be given in detail of an operation of the vehicle steering system S according to the first embodiment of the present invention with reference to the drawings.

Figure 5A:
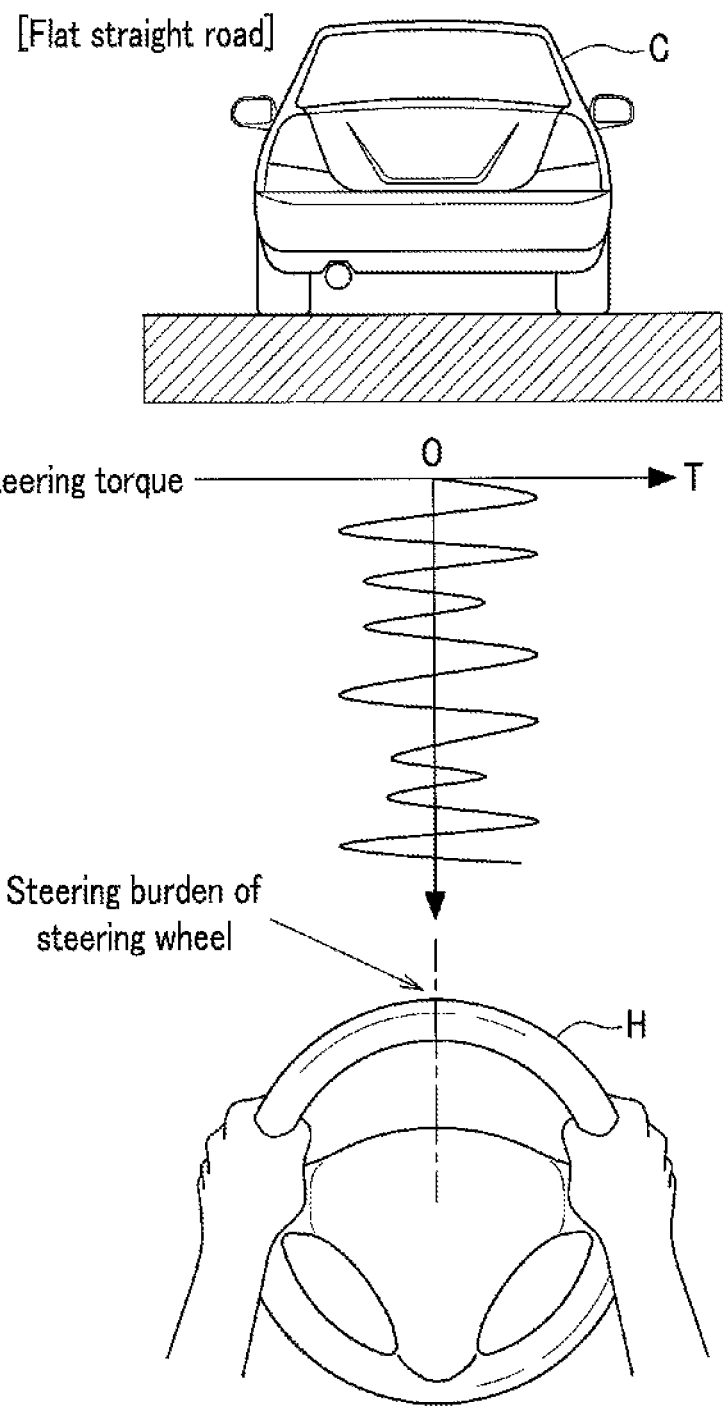
FIG. 5A is a diagram showing a relationship between inclination of the vehicle body and a steering torque when traveling on a flat straight road.
Figure 5B:
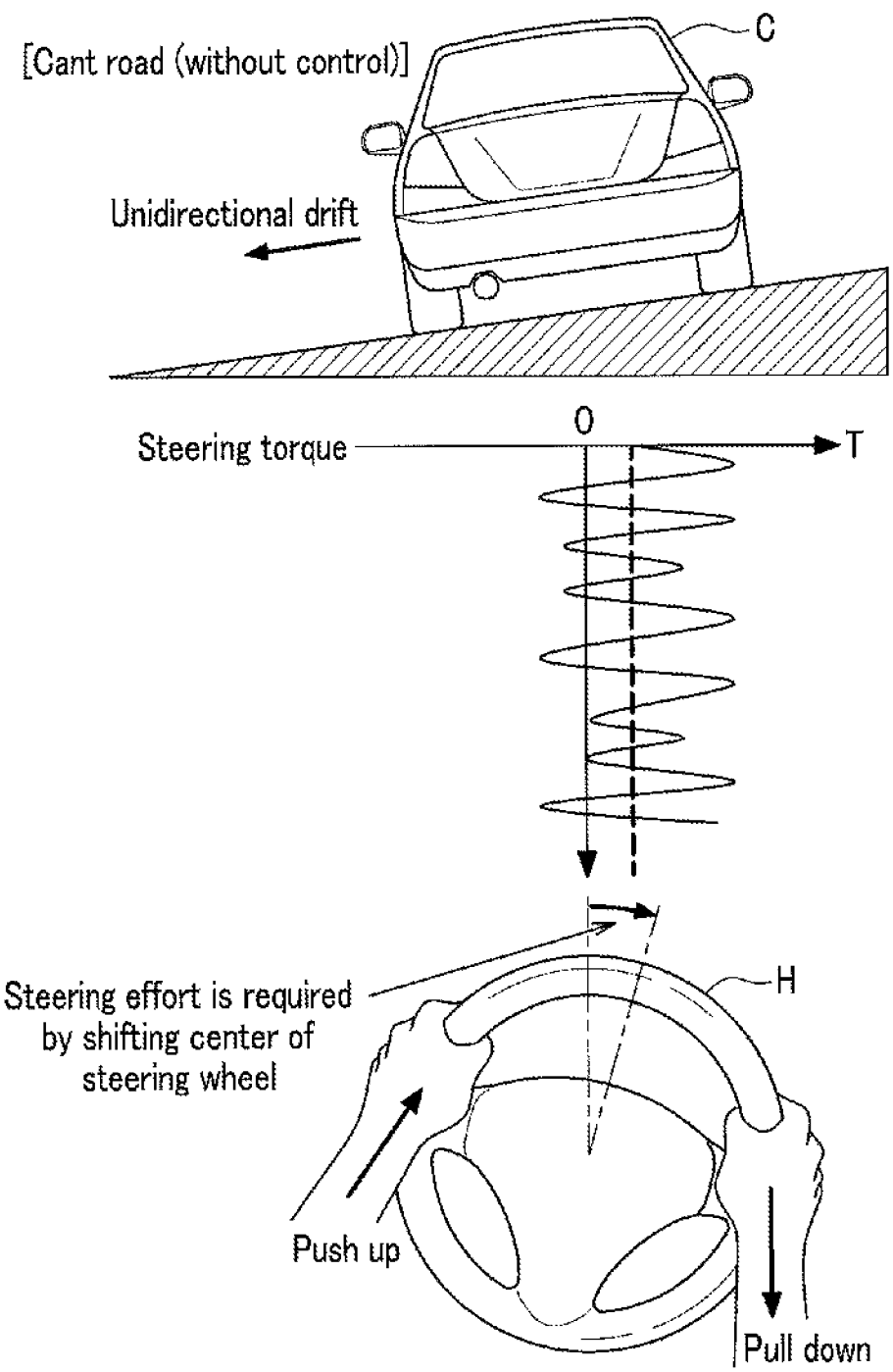
FIG. 5B is a diagram showing a relationship between inclination of the vehicle body and a steering torque while traveling on a cant road without an anti-unidirectional-drift control.
Figure 5C:
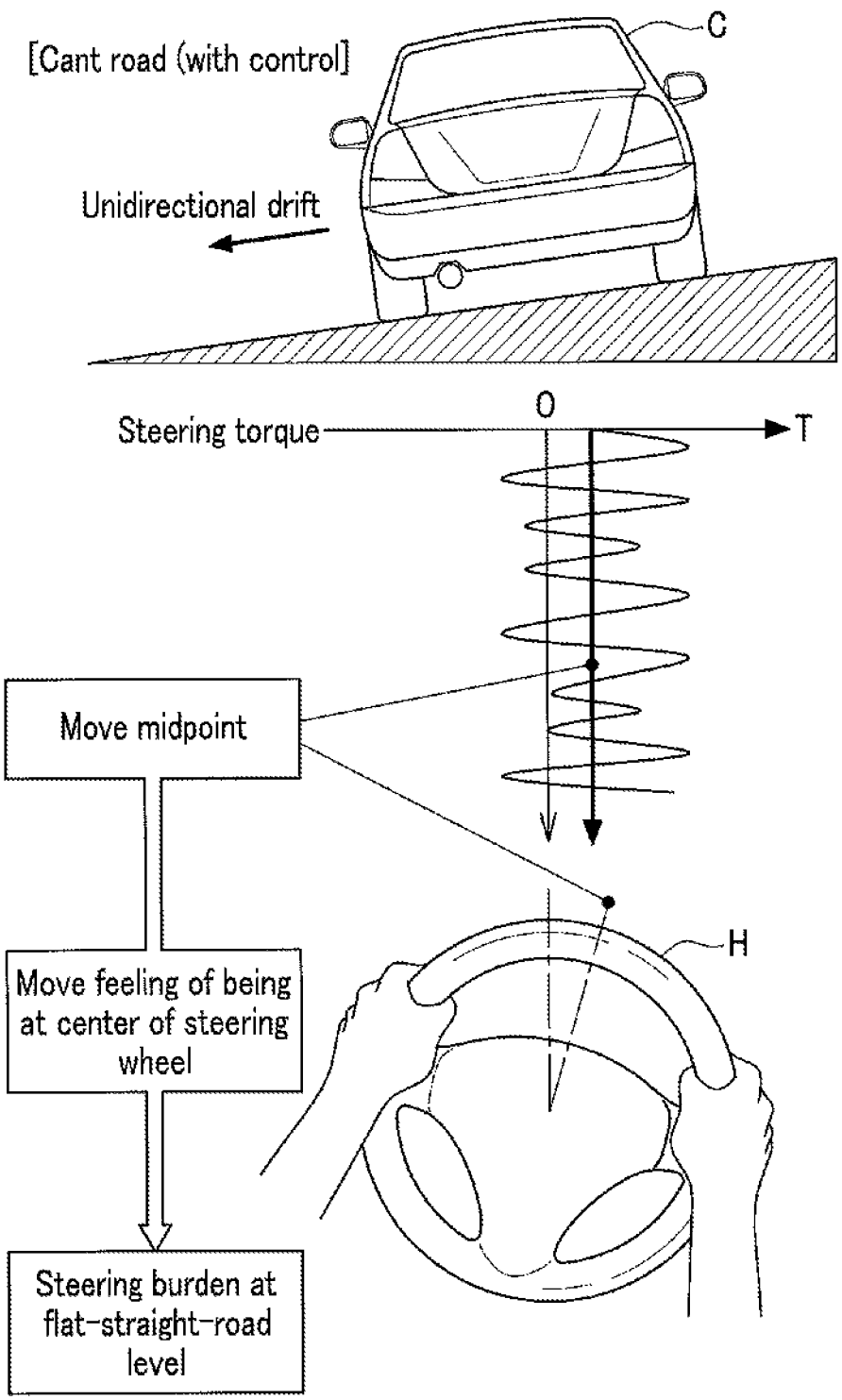
FIG. 5C is a diagram showing a relationship between inclination of the vehicle body and a steering torque while traveling on a cant road with an anti-unidirectional-drift control.

FIGS. 5A to 5C are diagrams, when the driver is driving the vehicle C to travel on a road, showing the relationship among the inclination of the vehicle body, changes of the steering torque, and operation of the driver against the unidirectional behavior. FIG. 5A depicts a scene where the vehicle C is traveling on a flat straight road without the anti-unidirectional-drift control. FIG. 5B depicts a scene where the vehicle C is traveling on a cant road without the anti-unidirectional-drift control (before turning on the anti-unidirectional-drift control). FIG. 5C depicts a scene where the vehicle C is traveling on a cant road with the anti-unidirectional-drift control (after turning on the anti-unidirectional-drift control).

FIG. 6A is a diagram showing the relationship between an external force applied to the vehicle C on a cant road and an operation of the driver against the unidirectional drift behavior. FIG. 6B is a diagram showing the relationship between an external force applied to the vehicle C on a cant road having different inclinations by lane, and an operation by the driver against the unidirectional drift behavior.

[Flat Straight Road]

While traveling on a flat straight road shown in FIG. 5A, the body of the vehicle C takes a substantially horizontal position with respect to the rolling direction. The steering angle of the steering wheel H in this case is essentially positioned substantially in the center. The characteristics of change in the steering torque indicates characteristics in which the steering torque repeats minute fluctuations side to side centered around the midpoint (reference position).

Note that the flat straight road means a straight road having substantially no inclination along the width direction of the road (not a cant road). In this case, the vertical undulation along the traveling direction (height difference) may or may not exist, but it is not a problem.

It is assumed that while traveling on a flat straight road shown in FIG. 5A, the driver of the vehicle C has turned on the CC switch SW provided on the steering handle H. Then, the CC operating unit 21 of the FI_ECU 2 shown in FIG. 2 performs the regulation of the opening of the DBW (Drive-By-Wire) valve 5 for directing the vehicle C to travel at a predetermined constant speed. Thus, the driver is relieved from a troublesome operation of the accelerator pedal for traveling at a constant speed.

In addition, when the CC switch SW is turned on, the CC operating unit 21 of the FI_ECU 2 outputs to the switch 14 a signal indicating that CC switch SW has been turned on. Triggered by the signal, while blocking the zero current value outputted from the zero current value outputting unit 13, the switch 14 passes the target current value outputted from the steering effort assist controlling unit 12 for canceling the unidirectional drift, to the limiter 15 in the subsequent stage. The adder 16 adds the target current value outputted from the steering effort assist controlling unit 12 to the target current value outputted from the EPS controlling unit 11, and then outputs the target current value after the addition to the motor driving unit 17.

However, in the scene where the vehicle is traveling on a flat straight road, the change characteristics of the steering torque shows, as shown in FIG. 5A, characteristics of repeating the minute fluctuations side to side centered around the midpoint (reference position). Therefore, the value of the additional torque which is integrated by the integrating unit 1205 shown in FIG. 4 does not exceed the midpoint movement determination threshold value set by the midpoint steering angle moving amount setting unit 1206.

That is, in the scene where the vehicle is traveling on a flat straight road, the midpoint steering angle moving amount setting unit 1206 shown in FIG. 4 outputs an initial value (e.g., 0 degree) as the anti-unidirectional-drift steering angle value. The steering effort assist current value setting unit 122 shown in FIG. 3 converts, based on the mapping information of the current value relative to the change in the anti-unidirectional-drift steering angle value, the anti-unidirectional-drift steering angle value, which causes no movement of the midpoint, to the current value (base current value). Here, in the scene where the vehicle is traveling on a flat straight road, all of the steering torque, the steering angle, and the rotation speed of the electric motor (temporally differentiated value of the steering angle) are small. Accordingly, the target anti-unidirectional-drift current value outputted from the steering effort assist controlling unit 12 becomes zero or a minute value close to zero.

Thus, even if the CC switch SW is turned on by a driver to add the target anti-unidirectional-drift current value outputted from the steering effort assist controlling unit 12, to the target current value outputted from the EPS controlling unit 11, a current value having the magnitude substantially at the same level as the target current value outputted from the EPS controlling unit 11 is supplied to the motor driving unit 17, in the scene where the vehicle is traveling on a flat straight road.

Note that a description has been given of the vehicle C according to the present embodiment, with an example in which respective functional units belonging to the steering effort assist controlling unit 12 are operating at all times to produce the target anti-unidirectional-drift current value every moment, but the present invention is not limited to this example. A configuration may be adopted such that the functional units, which belong to the steering effort assist controlling unit 12 and have been in sleep mode, are triggered to operate normally when the CC switch SW is turned on.

[Cant Road: Before Turning on Anti-Unidirectional-Drift Control]

As shown in FIG. 5B, on a cant road which is a road having an inclination along the width direction, a unidirectional drift behavior occurs on the vehicle C due to the gravity. On a cant road which is inclined downward left, as shown in FIG. 5B, a unidirectional drift behavior leftward may occur on the vehicle C. To cope with this unidirectional drift behavior, the driver will perform a steering effort operation to keep the steering angle with the steering handle H turned rightward.

The vehicle steering system S according to the embodiment of the present invention includes an electric power steering system having the EPS controlling unit 11 for performing a control to assist a force required for steering by the driver. Therefore, according to the vehicle steering system S, a target current value can be set that matches the magnitude of the steering torque, and then a current can be flown that has a value to follow the target current value, to the electric motor 3.

Incidentally, for example, the conventional electric power steering system according to Japanese Patent Application Publication No. 2001-001923 is designed for allowing a smooth steering when driving in environments including intersections, curved roads, parking areas, for example. Therefore, in the conventional electric power steering system according to Japanese Patent Application Publication No. 2001-001923, responses are not considered to the unidirectional drift behavior of the vehicle C on cant road or in a crosswind. Thus, in a case where a unidirectional drift behavior of the vehicle C occurs and magnitude of the steering torque against the unidirectional drift behavior is relatively small, an assist torque for the steering is hardly produced by the electric motor due to a reason that a dead zone is provided to the steering torque across the neutral point of the steering torque, or the like. Here, the neutral point of the steering torque means a steering angle position of the steering wheel H, where the magnitude of the torque is nearly balanced that is required for turning the steering handle H to each of the left and right.

Specifically, in the United States, for example, there is a cant road that lasts endlessly for aiming to improve drainage of the road. On such a cant road, applying the electric power steering system of the prior art according to Japanese Patent Application Publication No. 2001-001923 cannot reduce the physical burden of the driver for the steering.

On a cant road inclined downward left as shown in FIG. 5B, if an external force according to the inclination angle of the cant road exceeds a resistance force due to friction and the like, a unidirectional drift behavior of the vehicle C occurs downward along the inclined direction. In order to hold a state of traveling straight against such unidirectional drift behavior, the driver is forced to perform a steering effort operation to keep a state of turning the steering wheel H rightward. For this reason, the driver is forced to have a physical burden for the steering. As a result, with the conventional electric power steering system according to Japanese Patent Application Publication No. 2001-001923, the comfort of steering feeling provided to the driver has been impaired.

Now, it is assumed that the vehicle C has moved from a flat straight road to a cant road that is inclined downward left as shown in FIG. 5B. In addition, it is assumed that the CC switch SW has already been turned on when the vehicle C travels on a flat straight road. On a cant road, a unidirectional drift behavior of the vehicle C may occur.

Therefore, in order to respond to the unidirectional drift behavior of the vehicle C, the driver performs a steering effort operation to keep turning the steering wheel H rightward. A force to direct the vehicle C on the cant road to drift leftward and a resistance force occurring to the vehicle C by turning the steering wheel H rightward can be balanced to hold the vehicle C in the state of traveling straight. However, if such a state is continued for a long time, the driver will be forced to have a relatively large physical burden.

At this time, as shown in FIG. 4, the added value of the steering torque passing through the low-pass filter 1201, and the value converted by the torque converting unit 1202 from an output current of the electric motor 3 into a torque increases. In addition, an adding torque also continues to increase that is integrated by the integrating unit 1205.

In the midpoint movement cancellation determining unit 1204, if either one is satisfied whether the yaw rate detected by the yaw rate sensor 43 exceeds a predetermined threshold value or the rotation speed of the electric motor exceeds a predetermined threshold value, it is assumed that the state of traveling straight has been ended and a cancellation signal is generated for canceling the midpoint movement, and outputted to the integrating unit 1205 in the subsequent stage. Upon receipt of this cancellation signal, the integrating unit 1205 clears the integrated torque value to zero. The timing of the aforementioned cancel condition being satisfied can be, for example, at a time of changing a lane, turning left or right at an intersection or the like.

The midpoint steering angle moving amount setting unit 1206 determines whether or not the integrated torque value outputted every moment from the integrating unit 1205 exceeds the predetermined midpoint movement determination threshold value, and outputs a control signal indicating to move the midpoint, if the integrated torque value exceeds the midpoint movement determination threshold value, to the subtracting unit 121 shown in FIG. 3 as the output from the midpoint movement controlling unit 120.

Note that as long as the integrated torque value does not exceed the midpoint movement determination threshold value, even if the CC switch SW is turned on, the force required for the steering effort by the driver is not reduced. It is because the magnitude of the target anti-unidirectional-drift current value outputted from the steering effort assist controlling unit 12, when the integrated torque value is less than or equal to the midpoint movement determination threshold value, is considered not to be large enough to require the steering effort assist. Incidentally, the smaller the midpoint movement determination threshold value is set, the shorter the wait time becomes until the anti-unidirectional-drift control is turned on.

[Cant Road: After Turning on Anti-Unidirectional-Drift Control]

As shown in FIG. 5C, even on the same cant road as in FIG. 5B, if the anti-unidirectional-drift control of the EPS_ECU 1 is turned on, the midpoint movement controlling unit 120 of the steering effort assist controlling unit 12 shown in FIG. 3 performs a control to direct the midpoint moved. In the EPS_ECU 1 shown in FIG. 2, the adder 16 adds the target current value for the anti-unidirectional-drift control, outputted from the steering effort assist controlling unit 12 shown in FIG. 3 based on the midpoint after the movement, to the target current value outputted from the EPS controlling unit 11. Then, the motor driving unit 17 shown in FIG. 2 generates an actual current to be supplied to the electric motor 3.

The EPS_ECU 1 can turn on the anti-unidirectional-drift control to move the midpoint steering angle (midpoint) of the steering wheel H to the target anti-unidirectional-drift steering angle value, by required steering angle amount, so as to cancel the unidirectional drift behavior of the vehicle C, to reduce the physical burden, even under a situation where the unidirectional drift behavior of the vehicle C occurs, for the steering effort by the driver on the steering wheel H, and to realize the steering burden equivalent to that on a flat straight road. Here, turning on the anti-unidirectional-drift control means starting the anti-unidirectional-drift control.

In the first embodiment, as shown in FIG. 3, the multiplying unit 125 performs an operation to multiply the base current value, which is set in the steering effort assist current value setting unit 122 and a high-frequency component removal operation is performed by the low-pass filter 123, by the first ratio outputted from the first ratio outputting unit 124. Then, the multiplying unit 128 performs an operation to multiply the current value outputted from the damper controlling unit 126 by the second ratio outputted from the second ratio outputting unit. The damper current value after the multiplication has a large value for a quick steering operation, while it has a small value for a strong steering operation (a left or right turn, a lane change, a bypass behavior, or the like). The adding unit 129 performs an operation to add the damper current value after the multiplication to the base current value after multiplying the first ratio.

The steering effort assist controlling unit 12 performs a control to supply the electric motor 3 a driving current that assist the driver, even under the influence of an external force (steering by a sudden light force of the driver), such as from a cant road and/or a crosswind, so that the steering effort position of the steering wheel H (midpoint steering angle) is not fluctuated.

The steering effort assist controlling unit 12 outputs a base current value, which is multiplied by the first ratio in the multiplying unit 125 and then added with the damper current value in the adding unit 129, as the target anti-unidirectional-drift current value. The adder 16 adds the target current value for responding to the unidirectional drift, based on the moved midpoint outputted from the steering effort assist controlling unit 12 shown in FIG. 3, to the target current value outputted from the EPS controlling unit 11. Upon receipt of the target current value after the addition, the motor driving unit 17 shown in FIG. 2 generates the actual current to be supplied to the electric motor 3.

In the vehicle C according to the first embodiment, the EPS_ECU 1 performs a control, when the anti-unidirectional-drift control is turned on, to utilize a force of the electric motor 3 to suppress fluctuations of the steering angle of the steering wheel H due to the operation by the driver, even on a cant road or in a situation where a crosswind blows. Thus, a physical burden due to the steering effort by the driver when traveling on a cant road is relieved to the equivalent level, as compared to that when traveling on a flat straight road.

Incidentally, the anti-unidirectional-drift control executed by the EPS_ECU 1 is terminated when the CC switch SW is turned off by the driver, or the CC switch SW is turned off due to an accelerator pedal operation by the driver. Note that when the driver has steered the steering wheel H due to a lane change or the like, the integrated torque value obtained by integrating the adding torque in the integrating unit 1205 is cleared to zero by the instruction from the midpoint movement cancellation determining unit 1204, to stop moving the midpoint in the steering effort assist current value setting unit 122. However, if the cant road is continued even after the aforementioned steering and the driver continuously performs the steering effort responding to the cant road, the anti-unidirectional-drift control is turned on again to move the midpoint steering angle of the steering handle H (midpoint) so as to cancel the unidirectional drift behavior of the vehicle C.

[Flowchart for Cooperation with CC Switch]

Next, a description will be given of the vehicle steering system S, according to the first embodiment, mounted on the vehicle C which is traveling, with reference to FIG. 7A.

FIG. 7A is a flowchart schematically showing the cooperation between the CC operation and the anti-unidirectional-drift control in the first embodiment.

At step S1 shown in FIG. 7A, the EPS_ECU 1 examines whether or not the CC operating unit 21 of the FI_ECU 2 outputs the CC-in-operation flag, to determine whether or not the CC operation is operating. Here, the CC-in-operation flag is information outputted from the CC operating unit 21 of the FI_ECU 2 when the CC switch SW is turned on by the driver.

As a result of the determination at step S1, if it is determined that the CC operation is operating ("Yes" at step S1), the EPS_ECU 1 proceeds to the next step S2.

On the other hand, as a result of the determination at step S1, if it is determined that the CC operation is not operating ("No" at step S1), the EPS_ECU 1 jumps to step S3.

At step S2, in response to the determination that the CC operation is operating, the steering effort assist controlling unit 12 of the EPS_ECU 1 performs a control to turn on the steering effort assist control (anti-unidirectional-drift control). Thus, the switch 14 of the EPS_ECU 1 switches the type of signal to send to the limiter 15 so as to select the target anti-unidirectional-drift current value outputted from the steering effort assist controlling unit 13. As a result, the target anti-unidirectional-drift current value outputted from the steering effort assist controlling unit 12 is sent to the adder 16 via the limiter 15. The adder 16 adds the target anti-unidirectional-drift current value outputted from the steering effort assist controlling unit 12 to the target current value outputted from the EPS controlling unit 11, and then outputs the target current value after the addition to the motor driving unit 17.

It may adopt a configuration to display, on the display provided on the instrument panel, to indicate that the steering effort assist control (the anti-unidirectional-drift control) is ON.

Note that the determination is made that the CC operation is in operation, when the CC switch SW is turned on by the driver.

On the other hand, at step S3, in response to the determination that the CC operation is not operating, the steering effort assist controlling unit 12 of the EPS_ECU 1 performs a control to turn off the steering effort assist control (anti-unidirectional-drift control). Thus, the switch 14 of the EPS_ECU 1 switches the type of signal to send to the limiter 15 so as to select the zero current value outputted from the zero current value outputting unit 13. As a result, the zero current value outputted from the zero current value outputting unit 13 is sent to the adder 16 via the limiter 15. The adder 16 adds the zero current value outputted from the zero current value outputting unit 13 to the target current value outputted from the EPS controlling unit 11, and then outputs the target current value after the addition to the motor driving unit 17.

It may adopt a configuration to display, on the display provided on the instrument panel, to indicate that the steering effort assist control (the anti-unidirectional-drift control) is OFF.

Note that the determination is made that the CC operation is not operating, either when the CC switch SW is turned off by the driver, or when the CC switch SW is OFF due to braking operation by the driver.

In the first embodiment, it is assumed that various functional units inclusive of the integrating unit 1205 are basically working, as shown in FIGS. 2 to 4, even when the CC-in-operation flag is not outputted.

[Time Chart for Linkage with On/Off of CC Switch SW]

Next, a description will be given in chronological order of the operation of the vehicle steering system S, according to the first embodiment, mounted on the vehicle C which is traveling.

FIG. 7B is a time chart showing a temporal transition of the CC switch position. FIG. 7C is a time chart showing temporal changes in the actual steering angle of the steering wheel H. FIG. 7D is a time chart showing temporal changes in the anti-unidirectional-drift steering angle, with the steering angle $\theta$ at time t2 as an initial value. FIG. 7E is a time chart of the anti-unidirectional-drift control schematically showing temporal changes in the anti-unidirectional-drift steering angle, with the steering angle zero at time t2 as an initial value.

First, at time t1, the CC switch SW is not turned on, being in the OFF state (see FIG. 7B). At time t1, the actual steering angle of the steering handle H is in the position of zero (steered wheel WF is positioned in neutral) (see FIG. 7C). In the anti-unidirectional-drift steering angle value as shown in FIG. 7D, when the steering angle of the steering wheel H is less than a predetermined steering angle threshold value, the steering angle of the steering wheel H at that time is set as an initial value. It is assumed that in the example shown in FIG. 7C, the steering angle of the steering wheel H is less than the predetermined steering angle threshold value. In this case, the anti-unidirectional-drift steering angle value is 0. On the other hand, in the anti-unidirectional-drift steering angle value shown in FIG. 7E, the initial value is set to zero. In this case, the anti-unidirectional-drift steering angle value is 0.

During a time between times t1 and t2, the CC switch SW is kept OFF (see FIG. 7B). During that time, the actual steering angle of the steering wheel H gradually increases. This is based on the fact that in response to the vehicle C entering a cant road to start having a unidirectional drift behavior, the driver continues to steer the steering wheel H against the behavior. However, during a time between times t1 and t2, the anti-unidirectional-drift steering angle value shown in FIGS. 7D and 7E remains to be zero.

At time t2, the CC switch SW is turned on, and switched from OFF to ON (see FIG. 7B). At the timing of time t2, the CC operating unit 21 outputs the CC-in-operation flag to the steering effort assist controlling unit 12. In response to this, the steering effort assist controlling unit 12 starts preparing for the anti-unidirectional-drift control. At time t2, the actual steering angle of the steering handle H has a value of $\theta$ (see FIG. 7C). Here, at time t2, it is assumed that the integrated torque value has exceeded a predetermined threshold value. Thus, at time t2, the condition for starting the anti-unidirectional-drift control (the CC switch SW is ON and the integrated torque value has exceeded a predetermined threshold value) is satisfied. As a result, at time t2, the anti-unidirectional-drift steering angle value shown in FIG. 7D becomes $\theta$. On the other hand, the anti-unidirectional-drift steering angle value shown in FIG. 7E becomes zero.

After time t2, the CC switch SW remains to be ON (see FIG. 7B). Still after time t2, the actual steering angle of the steering wheel H gradually increases. This is based on the fact that in response to the vehicle C traveling on the cant road even after time t2 and the unidirectional drift behavior continuing, the driver keeps steering the steering wheel H against the behavior. After time t2, in response to the actual steering angle of the steering wheel H gradually increasing, as shown in FIGS. 7D and 7E, the anti-unidirectional-drift steering angle value increases in a stepwise manner. As a result, the labor required for steering effort on the steering wheel H by the driver can be reduced. At this time, the driver feels as if the neutral position of the steering angle of the steering wheel H were moved.

If the actual steering angle of the steering wheel H is set as the initial value of the anti-unidirectional-drift steering angle value, when the anti-unidirectional-drift control is started during the vehicle C is turning, an excessive anti-unidirectional-drift steering angle value may be set, causing the driver to feel discomfort. In this regard, setting 0 degree as the initial value of the anti-unidirectional-drift steering angle value can avoid the driver feeling discomfort as described above.

[Anti-Unidirectional-Drift Control During Turning]

Next, a case will be discussed where the CC switch SW is turned on, while the vehicle C is turning. During the vehicle C turning, the steering torque and the yaw rate increase, and the integrated torque value also increases.

It is assumed that the driver has turned on the CC switch SW at time t2 shown in FIGS. 7B to 7E. Then, the motor driving unit 17 uses the target current value added with the target anti-unidirectional-drift current value, to drive the electric motor 3. Accordingly, the midpoint movement is performed.

In the state that the midpoint has been moved as described above, if the vehicle C transitions from a state of turning to a state of traveling straight, the EPS_ECU 1 performs a control in the midpoint after the movement so as to suppress driving the electric motor 3. As a result, when the vehicle C is about to travel straight after transition from turning, the self-alignment torque does not work effectively. Therefore, the steering wheel H tends to return poorly.

In this regard, in the first embodiment, as shown in FIG. 4, the midpoint movement cancellation determining unit 1204 assumes, either when the yaw rate exceeds the predetermined threshold value or when the rotation speed of the electric motor (steering angle speed) exceeds a predetermined threshold value, that a cancel condition for canceling the movement of the midpoint is satisfied, and generates a cancellation signal, indicative of cancelling the movement of the midpoint, to output to the integrating unit 1205. This causes the integrated torque value in the integrating unit 1205 to be cleared to zero. As a result, the movement of the midpoint is not performed.

Thus, even if a condition for starting the anti-unidirectional-drift control (CC switch SW is ON and the integrated torque value has exceeded a predetermined threshold value) is satisfied during the vehicle C is turning, since the movement of the midpoint is canceled either when the yaw rate exceeds a predetermined threshold value or when the rotation speed of the electric motor (steering angle speed) exceeds a predetermined threshold value, returning of the steering wheel H due to the self-aligning torque is not significantly disturbed.

Note that in a transition period when the vehicle C is about to transition to a state of traveling straight from a state of turning, even if the yaw rate becomes smaller compared to a predetermined threshold value, the midpoint movement cancellation determining unit 1204 continues to output a cancellation signal for the movement of the midpoint to the integrating unit 1205, until a predetermined wait time elapses. This is because since there are fluctuations of the steering torque or the like during the transition period when the vehicle C is about to transition to the state of traveling straight from the state of turning, it is intended not to reflect the adding torque value during this period to the integrated torque value of the integrating unit 1205.

[Summary of the First Embodiment]

According to the vehicle steering system S of the first embodiment of the present invention, in conjunction with the ON/OFF of the CC switch SW, an appropriate steering effort assist can be performed using the anti-unidirectional-drift control, even in a situation, such as traveling on a cant road or in a crosswind, where an external force that causes a unidirectional drift behavior of the vehicle C is generated, and in such a situation an appropriate driving support has been difficult using the conventional electric power steering. As a result, the physical burden of the driver can be significantly reduced.

The vehicle steering system S according to the first embodiment has been discussed with an exemplary configuration that, in conjunction with the ON/OFF of the CC switch SW, switches the switch 14 to the steering effort assist controlling unit 12 when the CC switch SW is turned on, to enable the anti-unidirectional-drift control, but the invention of the first embodiment is not limited to this example. That is, a configuration may be adopted in which a switch for activating the anti-unidirectional-drift control is separately provided and when the switch is turned on, the switch 14 is switched to the steering effort assist controlling unit 12.

However, a scene where the anti-unidirectional-drift control is utilized and a scene where the cruise control is utilized are similar to each other. Therefore, the first embodiment has been designed not to have an independent switch for activating the anti-unidirectional-drift control, and to make the CC switch SW double as the aforementioned switch. Thus, contribution can be made to reducing the number of components and simplify the operation of the driver.

Second Embodiment

Next, a description will be given of a vehicle steering system according to a second embodiment of the present invention, with reference to FIGS. 8A and 8B.

Figure 8A:
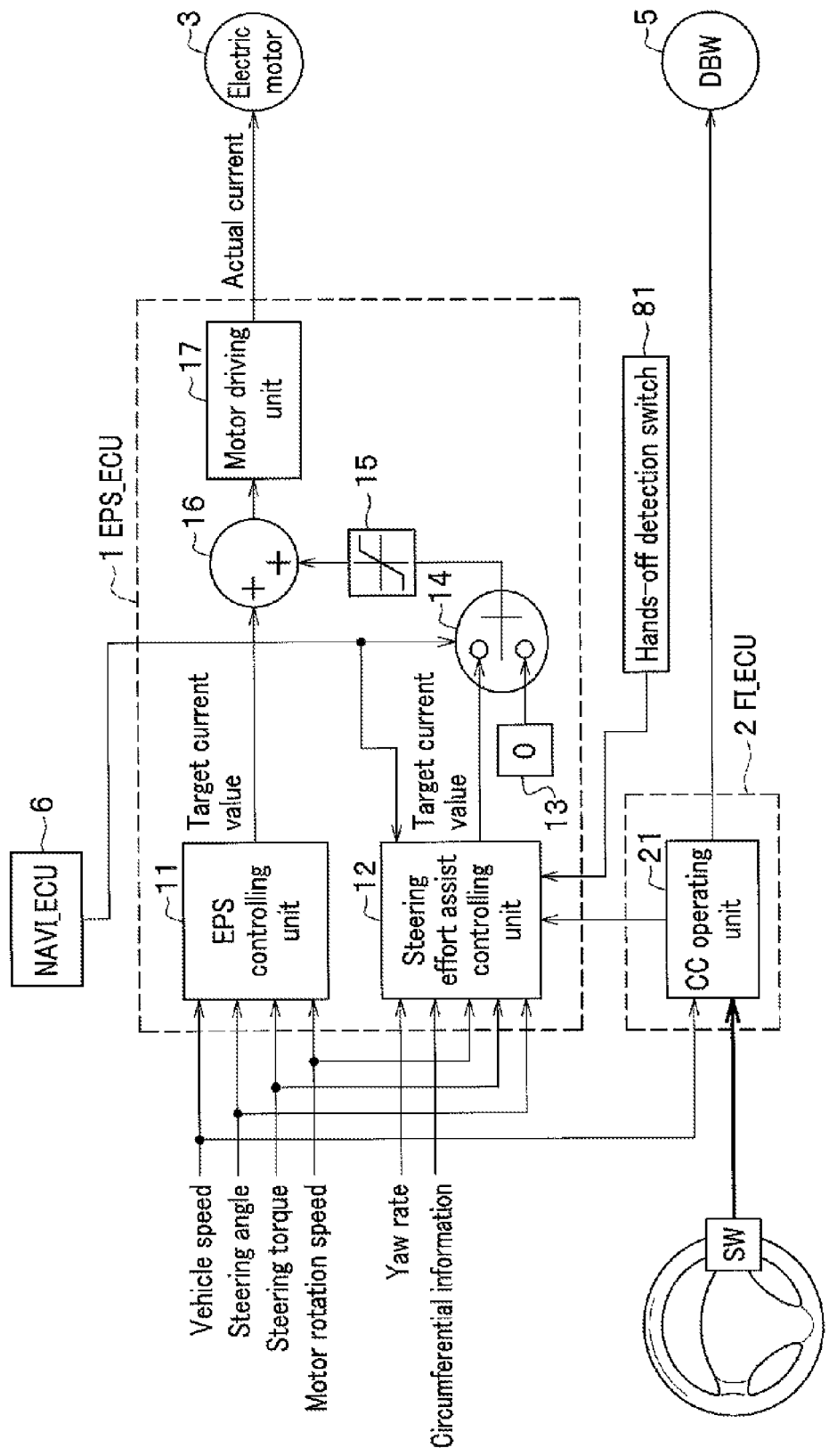
FIG. 8A is a block diagram showing a schematic configuration of a vehicle steering system according to a second embodiment of the present invention.

FIG. 8A is a block diagram showing a schematic configuration of a vehicle steering system according to a second embodiment of the present invention. FIG. 8B is a diagram showing an example of adjusting the mapping information of a current value relative to a steering angle, which information is set in the steering effort assist current value setting unit according to the second embodiment, for increasing the control amount of the anti-unidirectional-drift control. In the horizontal axis (steering angle) of the chart shown in FIG. 8B, positive and negative values represent rightward and leftward steering angles, respectively.

The vehicle steering system according to the second embodiment shown in FIG. 8A corresponds to the vehicle steering system according to the first embodiment shown in FIG. 2. Common members in both the first and second embodiments are assigned with common reference numerals, and duplicate descriptions will be omitted.

In the vehicle steering system S according to the first embodiment, the EPS_ECU 1 cooperates with the CC operating unit 21 of the FI_ECU 2. That is, in the first embodiment, under the assumption that when the CC switch SW is ON, a situation would more likely occur where the anti-unidirectional-drift control (steering effort assist control) is performed, steering with a large steering angle would rarely occur, and a situation would less likely to occur where the anti-unidirectional-drift control disturbs the comfort of the driver, the switch 14 is switched to the steering effort assist controlling unit 12 triggered by an operation of turning the CC switch SW on, to activate the anti-unidirectional-drift control.

In contrast, in the vehicle steering system according to the second embodiment, the EPS_ECU 1 cooperates with a NAVI_ECU 6 that is an electronic control device of a navigation system for guiding the vehicle C for a route up to a preset destination. That is, in the second embodiment, if the NAVI_ECU 6 determines that the current position of the vehicle C is on a straight road, a signal indicating the result (on-a-straight-road flag) is outputted to switch the switch 14 to the steering effort assist controlling unit 12, and on the other hand if the NAVI_ECU 6 determines that the current position of the vehicle C is not on a straight road, a signal indicating the result (not-on-a-straight-road flag) is outputted to switch the switch 14 to the zero current value outputting unit 13.

In addition, in the vehicle steering system according to the second embodiment, the EPS_ECU 1 cooperates with the CC operating unit 21 of the FI_ECU 2 in a different aspect from the first embodiment. That is, a situation where the CC switch SW is turned on by a driver can be a situation where the driver is less likely willing to do the steering in person. In such a situation, a force to hold the steering wheel H is more likely weakened. Therefore, in the second embodiment, the steering effort assist controlling unit 12 is designed to adopt a configuration of cooperating with the CC operating unit 21 to increase the control amount for the anti-unidirectional-drift control (target anti-unidirectional-drift current value) when the CC operating unit 21 is operating (CC-in-operation flag has been received), compared to the control amount for the anti-unidirectional-drift control when the CC operating unit 21 is not operating (CC-in-operation flag has not been received).

For actually increasing the control amount for the anti-unidirectional-drift control, several examples may be presented.

Figure 8B:
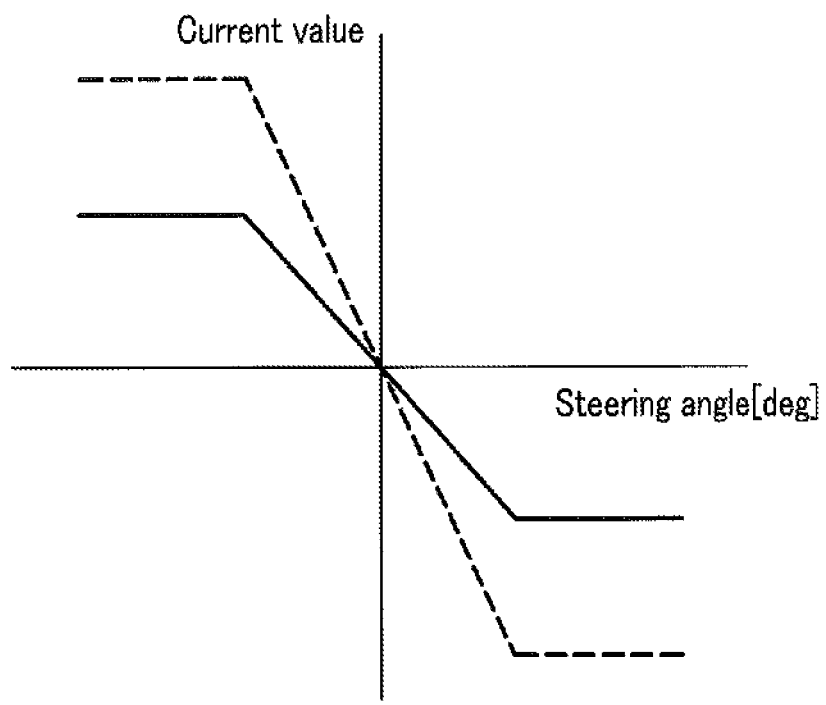
FIG. 8B is an explanatory diagram showing an example of increasing the control amount for the anti-unidirectional-drift control by adjusting the mapping information of a current value relative to a steering angle, which information is set by a steering-effort-assist-current-value setting unit according to the second embodiment.

In the first embodiment, as shown in FIG. 8B, the characteristics associated with the mapping information of the current value (base current value:absolute value) relative to the steering angle, in the steering effort assist current value setting unit 122 shown in FIG. 3, are changed from reference characteristics shown in a solid line to assist characteristics shown in a dashed line for sharpening responsiveness. According to the characteristics shown in FIG. 8B, the current values in a steering angle range extending equally from side to side across the midpoint steering angle (steering angle of zero) indicates characteristics having a linear inclination passing through the origin, while the current values outside the above-mentioned steering angle range indicates characteristics having a predetermined value. This holds true in both the reference characteristics and the assist characteristics.

In the second embodiment, the moving amount for the anti-unidirectional-drift steering angle value set by the midpoint steering angle moving amount setting unit 1206 shown in FIG. 4 is directed to be increased, as compared to the moving amount for the anti-unidirectional-drift steering angle value based on the initial setting (inclusive of the immediately preceding value).

In the third embodiment, the value of the midpoint movement determination threshold value set by the midpoint steering angle moving amount setting unit 1206 shown in FIG. 4 is directed to be set lower, as compared to the value based on the initial setting (inclusive of the immediately preceding value).

According to the vehicle steering system of the second embodiment, since the steering effort assist controlling unit (anti-unidirectional-drift controlling unit) 12 increases the control amount for the anti-unidirectional-drift control when the CC operating unit 21 is operating, as compared to the control amount for the anti-unidirectional-drift control when the CC operating unit 21 is not operating, even if the CC operating unit 21 is changed to operate during the anti-unidirectional-drift control is being performed, lack of steering effort on the steering wheel H by the driver can be timely compensated. This is because if the CC operating unit 21 is operating, the steering effort on the steering wheel H by the driver tends to be weaker, as compared to a case of not being operating.

Note that when the second embodiment has been described, a description has been given of an example to detect whether or not the steering effort on the steering handle H by the driver is weakened, by associating with the case where the CC operating unit 21 is operating, but the present invention is not limited to this example. A configuration may be adopted to include a hands-off detection sensor 81 (see FIG. 8A) that detects whether the driver grips the steering wheel H firmly (not takings hands off), for the steering effort assist controlling unit 12 to monitor a hands-off detection signal from this hands-off detection sensor 81 and, when it is detected that the driver takes the hands off the steering wheel H, to increase the control amount for the anti-unidirectional-drift control, as compared to the control amount for the anti-unidirectional-drift control when it is detected that the driver grips the steering wheel H firmly.

In addition, in the second embodiment, a configuration may be adopted in which either a condition that the CC operating unit 21 is operating or a condition that the driver takes the hands off the steering wheel H, or both is/are satisfied, the control amount for the anti-unidirectional-drift control when the aforementioned condition(s) is/are satisfied is increased, as compared to the control amount for the anti-unidirectional-drift control when the aforementioned condition is not satisfied.

Next, an exemplary modification of the second embodiment will be described with reference to FIG. 8A.

In the exemplary modification of the second embodiment, for example, a case is assumed where the vehicle C receives a strong crosswind immediately after exiting a tunnel, causing a sudden unidirectional drift behavior of the vehicle C.

That is, in the exemplary modification of the second embodiment, the steering effort assist controlling unit 12 is designed to adopt a configuration to increase the control amount for the anti-unidirectional-drift control (target anti-unidirectional-drift current value) immediately after the vehicle C exits the tunnel, as compared to the control amount for the anti-unidirectional-drift control based on the initial setting (or the control amount immediately before exiting the tunnel).

Whether or not the vehicle C has exited the tunnel may be determined, for example, by using one or more of information, as appropriate, among image data obtained from the in-vehicle camera, brightness data obtained from the illumination sensor, lighting state data inclusive of flashing of the headlights, circumferential information of the vehicle C obtained via the Web inclusive of wind data, and map data obtained from the navigation system, or a combination of some of these.

According to the exemplary modification of the second embodiment, even when the vehicle C travels straight in a situation where the vehicle C receives a strong crosswind immediately after exiting a tunnel, the comfort of steering feeling provided to the driver can be retained.

Third Embodiment

In the second embodiment, a description has been given of an example in which, for example, in response to the steering effort on the steering wheel H by the driver being weakened, the control amount for the anti-unidirectional-drift control when the steering effort is weakened is increased, as compared to the control amount for the anti-unidirectional-drift control when the steering effort is not weakened.

In contrast, in the third embodiment, an embodiment will be described, with reference to FIGS. 9A and 9B, in which, contrary to the second embodiment, the control amount for the anti-unidirectional-drift control (target anti-unidirectional-drift current value) is decreased.

Note that decreasing the control amount for the anti-unidirectional-drift control includes stopping the anti-unidirectional-drift control.

Figure 9A:
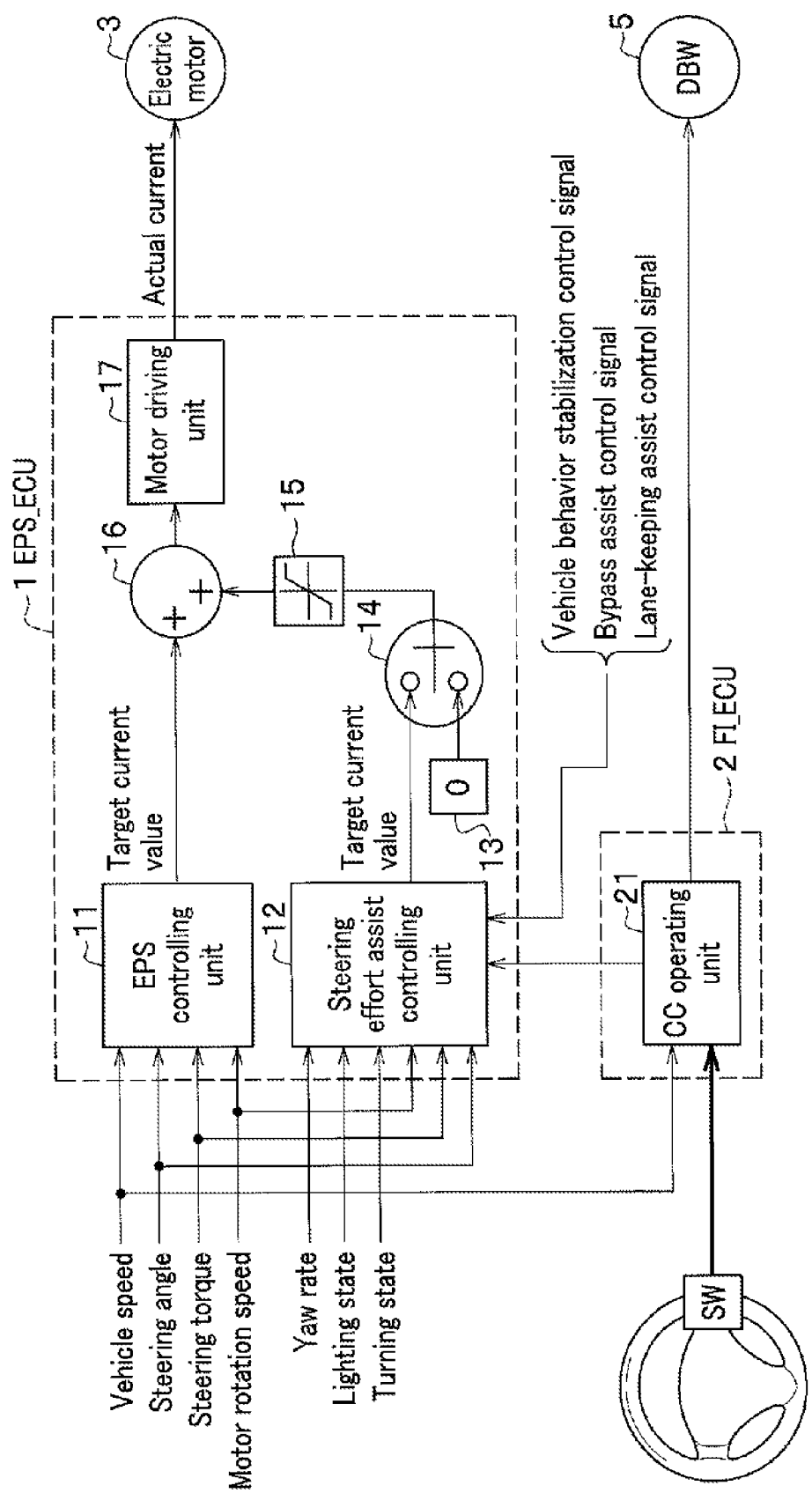
FIG. 9A is a block diagram showing a schematic configuration of a vehicle steering system according to a third embodiment of the present invention.

FIG. 9A is a block diagram showing a schematic configuration of a vehicle steering system according to a third embodiment of the present invention. FIG. 9B is a diagram showing an example of adjusting the mapping information of the current value relative to the steering angle set in the steering effort assist current value setting unit according to the third embodiment to decrease the control amount for the anti-unidirectional-drift control. In the horizontal axis (steering angle) of the chart shown in FIG. 9B, positive and negative values represent rightward and leftward steering angles, respectively.

The vehicle steering system according to the third embodiment shown in FIG. 9A corresponds to the vehicle steering system according to the first embodiment shown in FIG. 2. Common members in both the first and third embodiments are assigned with common reference numerals, and duplicate descriptions will be omitted.

[While Traveling at Low Vehicle Speed or Parking]

While traveling at a low vehicle speed or parking, the vehicle C is relatively unaffected by the inclination of a cant road. Therefore, in the vehicle steering system according to the third embodiment, when the vehicle speed based on the wheel speed sensor 44 is at a low vehicle speed lower than or equal to a reference speed (modifiable as appropriate), such as 10 kilometers per hour, or when parking with a vehicle speed of zero, the control amount for the anti-unidirectional-drift control (target anti-unidirectional-drift current value) is decreased (inclusive of stopping the anti-unidirectional-drift control itself), as compared to the control amount for the anti-unidirectional-drift control when the vehicle is traveling at a vehicle speed exceeding the reference speed.

According to the vehicle steering system of the third embodiment, an operation rate of the anti-unidirectional-drift control can be reduced for optimization when the vehicle speed is less than a predetermined threshold value (traveling at a low vehicle speed or parking) in which case the unidirectional drift behavior of the vehicle less likely occurs.

In order to actually decrease the control amount for the anti-unidirectional-drift control, there can be several embodiments.

Figure 9B:
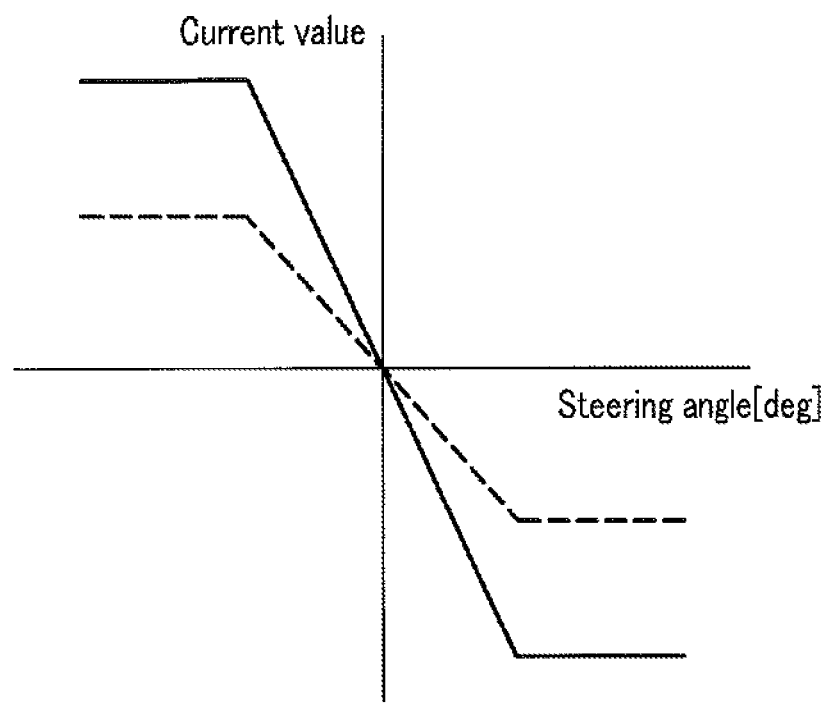
FIG. 9B is an explanatory diagram showing an example of increasing the control amount for the anti-unidirectional-drift control by adjusting the mapping information of a current value relative to a steering angle, which information is set by a steering-effort-assist-current-value setting unit according to the third embodiment.

In the fourth embodiment, as shown in FIG. 9B, characteristics associated with the mapping information of the current value (base current value:absolute value) relative to the steering angle, in the steering effort assist current value setting unit 122 shown in FIG. 3, are changed from reference characteristics indicated in a solid line to assist characteristics indicated in a broken line for blunting the responsiveness. According to the characteristics shown in FIG. 9B, the current values in a steering angle range extending equally from side to side across the midpoint steering angle (steering angle of zero) indicates characteristics having a linear inclination passing through the origin, while the current values outside the above-mentioned steering angle range indicates characteristics having a predetermined value. This holds true in both the reference characteristics and the assist characteristics.

In the fifth embodiment, the moving amount for the anti-unidirectional-drift steering angle value set by the midpoint steering angle moving amount setting unit 1206 shown in FIG. 4 is directed to be decreased, as compared to the moving amount for the anti-unidirectional-drift steering angle value based on the initial setting (inclusive of the immediately preceding value).

In the sixth embodiment, the value of the midpoint movement determination threshold value set by the midpoint steering angle moving amount setting unit 1206 shown in FIG. 4 is directed to be set larger, as compared to the immediately preceding value (e.g., initial value).

In addition, in order to stop the anti-unidirectional-drift control, for example, the switch 14 may be switched to the zero current value outputting unit 13.

[Poor Visibility Case: Modification 1]

For example, if the vehicle C is traveling in the poor visibility environment (during night or in a fog), the visual visibility by the driver becomes worse in the traveling direction. Therefore, even though the steering angle of the steering wheel H can be adapted to the target steering angle, which responds to a cant road, during daytime or when the visibility is good without a fog, steering accuracy of the steering wheel H becomes worse when the visibility is poor. Then, when the visibility is poor, frequency of steering correction increases.

If the frequency of steering correction increases, the movement of the midpoint steering angle due to the anti-unidirectional-drift control is performed frequently. Then, the driver may feel discomfort.

Therefore, by using the fourth to sixth embodiments as appropriate, the vehicle steering system according to a first modification of the third embodiment directs the control amount for the anti-unidirectional-drift control (target anti-unidirectional-drift current value) to be decreased (inclusive of stopping the anti-unidirectional-drift control itself) when the vehicle C is traveling in a poor visibility environment, as compared to the control amount for the anti-unidirectional-drift control when the vehicle C is traveling in a good visibility environment.

According to the vehicle steering system of the first modification of the third embodiment, even when the vehicle C is traveling in a poor visibility environment, the effect of retaining the comfort of steering feeling provided to the driver can be expected.

Note that whether or not the vehicle C is traveling in a poor visibility environment (during night or in a fog) may be detected as appropriate, for example, based on ON/OFF information of a switch for flashing headlights or fog lights, time information of the clock mounted on the vehicle C, or the like.

[During Turning: Modification 2]

In the vehicle steering system according to a second modification of the third embodiment, the steering effort assist controlling unit (anti-unidirectional-drift controlling unit) 12 may have a configuration in which the fourth to sixth embodiments are used as appropriate to decrease (inclusive of stopping the anti-unidirectional-drift control itself) the control amount for the anti-unidirectional-drift control (target anti-unidirectional-drift current value) when the vehicle C is turning left or right, as compared to the control amount for the anti-unidirectional-drift control when the vehicle C is traveling straight.

According to the vehicle steering system of the second modification of the third embodiment, an operating rate of the anti-unidirectional-drift control can be reduced and moderated when the vehicle is turning left or right, in which case the unidirectional-drift behavior of the vehicle less likely occurs. Note that whether or not the vehicle C is turning left or right may be determined, for example, by referring to turning state data of the turn switch operated by the driver.

[During Vehicle Behavior Stabilization Control: Modification 3]

A vehicle steering system according to a third modification of the third embodiment further includes a vehicle behavior stabilization controlling unit that performs a vehicle behavior stabilization control for stabilizing the behavior of the vehicle. For the vehicle behavior stabilization controlling unit, known technologies, such as ABS (Anti Brake Lock System) and VSA (Vehicle Stability Assist: registered trademark), may be employed as appropriate.

The steering effort assist controlling unit (anti-unidirectional-drift controlling unit) 12 may have a configuration in which the fourth to sixth embodiments are used as appropriate to decrease (inclusive of stopping the anti-unidirectional-drift control itself) the control amount for the anti-unidirectional-drift control when the vehicle behavior stabilization control is performed, as compared to the control amount for the anti-unidirectional-drift control when the vehicle behavior stabilization control is not performed.

According to the vehicle steering system according to the third modification of the third embodiment, since the steering effort assist controlling unit 12 decreases the control amount for the anti-unidirectional-drift control when the vehicle behavior stabilization control is performed, as compared to the control amount for the anti-unidirectional-drift control when the vehicle behavior stabilization control is not performed, an operating rate of the anti-unidirectional-drift control can be reduced and moderated when the vehicle behavior stabilization control is performed, in which case the unidirectional-drift behavior of the vehicle C less likely occurs.

[During Bypass Assist Control: Modification 4]

A vehicle steering system according to a fourth modification of the third embodiment further includes a bypass assist controlling unit that performs a bypass assist control for assisting a bypass operation with respect to an obstacle around the vehicle C. For the bypass assist controlling unit, for example, a feature of a contact avoidance support device disclosed in Japanese Patent Application Publication No. 2009-255629 may be adopted as appropriate.

The steering effort assist controlling unit (anti-unidirectional-drift controlling unit) 12 may have a configuration in which the fourth to sixth embodiments are used as appropriate to decrease (inclusive of stopping the anti-unidirectional-drift control itself) the control amount for the anti-unidirectional-drift control when the bypass assist control is performed, as compared to the control amount for the anti-unidirectional-drift control when the bypass assist control is not performed.

According to the vehicle steering system of the fourth modification of the third embodiment, since the steering effort assist controlling unit 12 decreases the control amount for the anti-unidirectional-drift control when the bypass assist control is performed, as compared to the control amount for the anti-unidirectional-drift control when the bypass assist control is not performed, an operating rate of the anti-unidirectional-drift control can be reduced and moderated when the bypass assist control is performed, in which case the unidirectional-drift behavior of the vehicle C less likely occurs.

Note that in the bypass assist controlling unit, a configuration may be adopted in which the control amount for the anti-unidirectional-drift control can be varied according to a time to collision (TTC). Specifically, the bypass assist controlling unit is directed, for example, to decrease the control amount (target anti-unidirectional-drift current value) when the TTC is 2 seconds, as compared the control amount when the TTC is 5 seconds.

[During Lane-Keeping Assist Control: Modification 5]

A vehicle steering system according to a fifth modification of the third embodiment further includes a lane-keeping assist controlling unit that performs a lane-keeping assist control for assisting the vehicle C to keep the traveling lane. For the lane-keeping assist controlling unit, for example, a feature of the driving support device disclosed in Japanese Patent Application Publication No. 2007-083818 may be adopted as appropriate.

The steering effort assist controlling unit (anti-unidirectional-drift controlling unit) 12 may have a configuration in which the fourth to sixth embodiments are used as appropriate to decrease (inclusive of stopping the anti-unidirectional-drift control itself) the control amount for the anti-unidirectional-drift control when the lane-keeping assist control is performed, as compared to the control amount for the anti-unidirectional-drift control when the lane-keeping assist control is not performed.

According to the vehicle steering system of the fifth modification of the third embodiment, since the steering effort assist controlling unit 12 decreases the control amount for the anti-unidirectional-drift control when the lane-keeping assist control is performed, as compared to the control amount for the anti-unidirectional-drift control when the lane-keeping assist control is not performed, an operating rate of the anti-unidirectional-drift control can be reduced and moderated when the lane-keeping assist control is performed, in which case the unidirectional-drift behavior of the vehicle C less likely occurs.

[When Driver being Tired: Modification 6]

When the driver is tired, there is also a tendency, in the same manner as in the case when the vehicle C is traveling in a poor visibility environment (during night or in a fog), that frequency of steering correction by the driver increases.

If the frequency of steering correction increases, the movement of the midpoint steering angle due to the anti-unidirectional-drift control is performed frequently. Then, the driver may feel discomfort.

Therefore, by using the fourth to sixth embodiments as appropriate, the vehicle steering system according to a sixth modification of the third embodiment directs the control amount for the anti-unidirectional-drift control (target anti-unidirectional-drift current value) to be decreased when the driver is tired, as compared to the control amount for the anti-unidirectional-drift control when the driver is normal.

According to the vehicle steering system of the sixth modification of the third embodiment, even when the driver is tired, the effect of retaining the comfort of steering feeling provided to the driver can be expected.

Note that whether or not the driver is tired may be determined as appropriate, for example, by diagnosing fluctuations of the steering wheel H, based on values obtained by temporally differentiating the steering angle data from the steering angle sensor 41, values obtained by temporally differentiating the steering torque data from the steering torque sensor 42, or the like, and then referring to the fluctuations of the steering wheel H diagnosed above.

Fourth Embodiment

In the vehicle steering systems according to the first to third embodiments, a description has been given, showing examples, of the anti-unidirectional-drift control, with which the EPS_ECU 1 moves the midpoint steering angle (midpoint) of the steering wheel H by the required amount (steering angle) to the target anti-unidirectional-drift steering angle value so as to cancel the unidirectional drift behavior of the vehicle C.

In contrast, in addition to the anti-unidirectional-drift control of the vehicle steering system that focuses on the midpoint moving amount according to the first to third embodiments, a vehicle steering system according to a fourth embodiment focuses on the midpoint moving speed when moving the midpoint steering angle (midpoint) of the steering wheel H by the required amount (steering angle) to the target anti-unidirectional-drift steering angle value. This midpoint moving speed set variably according to the traveling state of the vehicle C including a vehicle speed. Thus, the vehicle steering system according to the fourth embodiment can ensure both the comfort of steering feeling by moving the midpoint, and stability of the steering.

Figure 11:
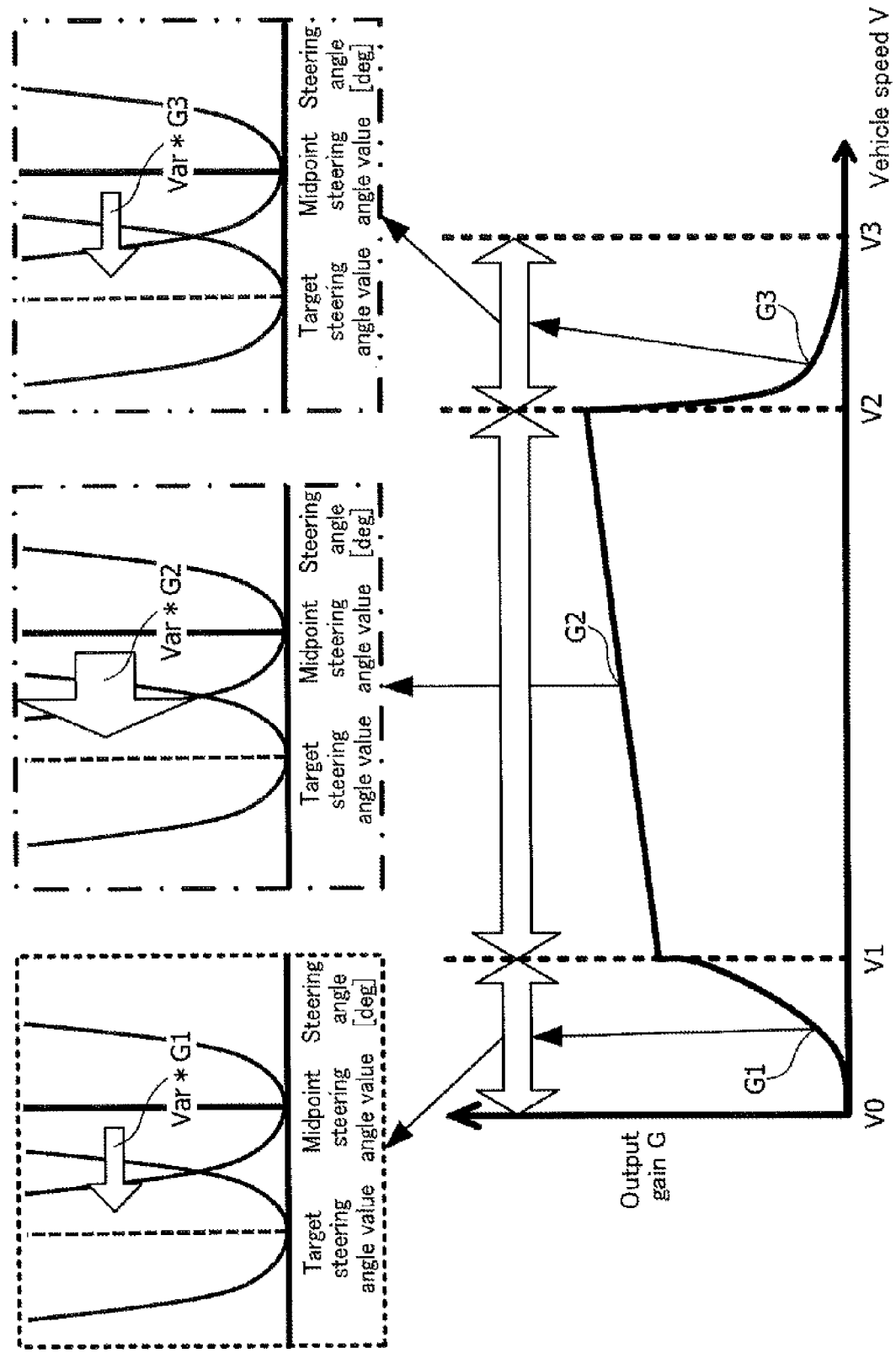
FIG. 11 is a diagram illustrating an operation of a vehicle steering system according to the fourth embodiment of the present invention.
Figure 12:
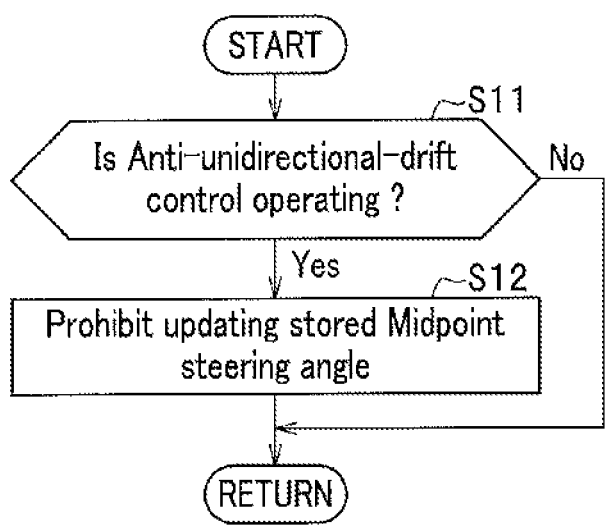
FIG. 12 is a flowchart illustrating the operation of the vehicle steering system according to the fourth embodiment of the present invention.

A description will be given of the vehicle steering system according to the fourth embodiment, with reference to FIGS. 10 to 12.

Figure 10:
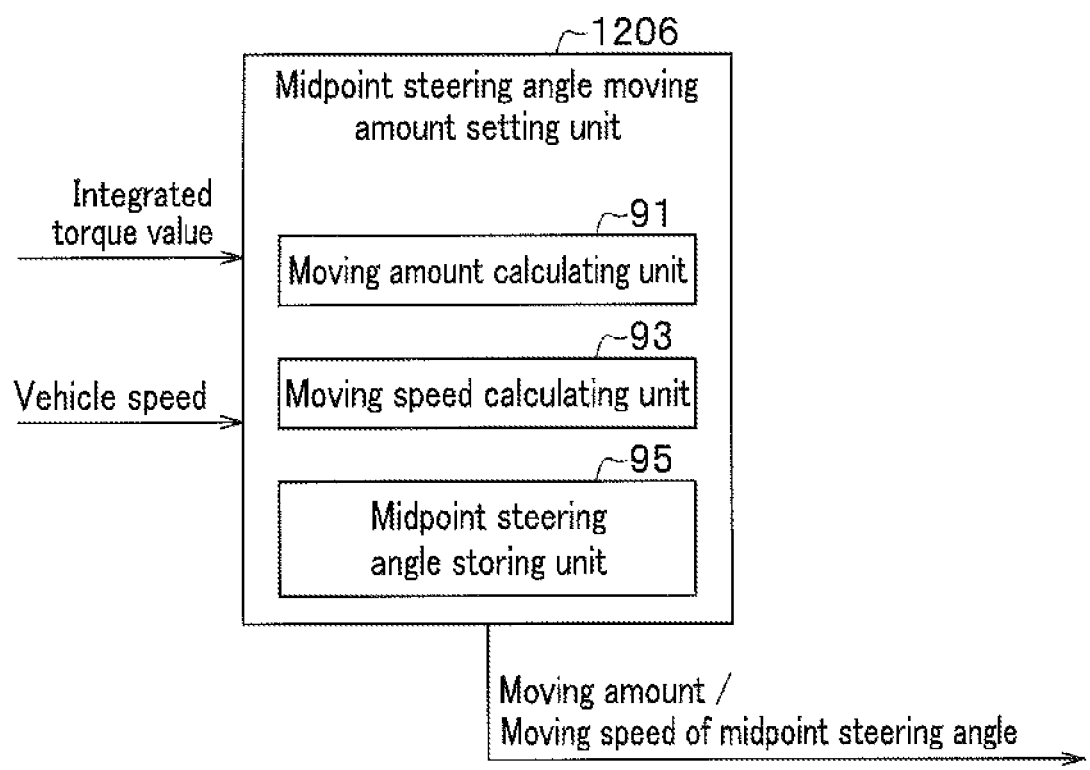
FIG. 10 is a block diagram showing a configuration of inside of and peripheral to a midpoint-steering-angle-moving-amount setting unit in the vehicle steering system according to fourth and fifth embodiments of the present invention.

FIG. 10 is a block diagram showing the configuration of inside of and peripheral to the midpoint steering angle moving amount setting unit 1206 in the vehicle steering system according to the fourth embodiment of the present invention. FIG. 11 is a diagram illustrating an operation of the vehicle steering system according to the fourth embodiment. FIG. 12 is a flowchart illustrating the operation of the vehicle steering system according to the fourth embodiment.

As shown in FIG. 10, the midpoint steering angle moving amount setting unit 1206 includes a moving amount calculating unit 91, a moving speed calculating unit 93, and a midpoint steering angle storing unit 95.

The moving amount calculating unit 91 has a feature, when moving the midpoint steering angle of the steering wheel H to the target anti-unidirectional-drift steering angle value, of calculating the moving amount, based on the integrated torque value outputted from the integrating unit 1205 in FIG. 4. When calculating the moving amount of the midpoint steering angle, the mapping information of moving amount of the midpoint steering angle relative to the integrated torque value can be referred to as appropriate. This mapping information may be basically set to have characteristics, in which, for example, the larger the integrated torque value becomes, the larger the moving amount of the midpoint steering angle becomes. However, it is preferable that as the integrated torque value increases, the inclination of the characteristics of the corresponding moving amount of the midpoint steering angle gradually decreases.

Note that when setting the mapping information of the moving amount of the midpoint steering angle relative to the integrated torque value, proper characteristics may be set through an in-vehicle experiment, simulation, or the like.

The moving speed calculating unit 93 has a feature of calculating a moving speed when moving the midpoint steering angle of the steering wheel H to the target anti-unidirectional-drift steering angle value based on the vehicle speed due to the detection value of the wheel speed sensor 44. When calculating the moving speed of the midpoint steering angle, mapping information may be referred to as appropriate in which output gain G (multiplied by the moving speed of the midpoint steering angle) is related to the vehicle speed. This mapping information may be set, for example, as shown in FIG. 11, to have characteristics in a low-speed region of V0 to V1, where the output gain G (G1 in FIG. 11) shows a slowly increasing trend at the beginning when the vehicle speed starts to increase, and a steep rise trend when the vehicle speed becomes high to some extent, to have linear characteristics in a middle-speed region of V1 to V2, where the output gain G (G2 in FIG. 11) shows a gently increasing trend, and to have characteristics in a high-speed region of V2 to V3, where the output gain G (G3 in FIG. 11) sharply falls at the beginning and shows a slowly decreasing trend as the vehicle speed increases. The moving speed of the midpoint steering angle may be calculated by multiplying a reference speed Var by the output gain, which can be obtained based on the vehicle speed and the mapping information.

Note that when setting the mapping information of the output gain G relative to the vehicle speed, proper characteristics may be set through an in-vehicle experiment, simulation, or the like.

The midpoint steering angle storing unit 95 has a feature of storing information about the midpoint steering angle (information of the moving amount and the moving speed of the midpoint steering angle), which is updated every moment.

[Operation]

Next, a description will be given of an operation of a vehicle steering system according to the fourth embodiment, focusing on the update timing of stored midpoint steering angle of the steering wheel H, with reference to FIG. 12. It is assumed that the stored midpoint steering angle of the steering handle H is updated as appropriate at a predetermined timing, such as when the vehicle is traveling straight.

At step S11, the EPS_ECU 1 determines whether or not the anti-unidirectional-drift control is operating. As a result of the determination at step S11, if a determination is made that the anti-unidirectional-drift control is operating, the EPS_ECU 1 proceeds to the next step S12 in the process flow. On the other hand, as a result of the determination at step S11, if a determination is made that the anti-unidirectional-drift control is not operating, the EPS_ECU 1 returns to step S11 in the process flow, to perform subsequent processing.

At step S12, the midpoint steering angle moving amount setting unit 1206 included in the steering effort assist controlling unit 12 of the EPS_ECU 1 prohibits updating the stored midpoint steering angle of the steering wheel H.

[Operation Effect]

In the vehicle steering system according to the fourth embodiment, the midpoint moving speed is focused when moving the midpoint steering angle (midpoint) of the steering wheel H by the required amount (steering angle) to the target anti-unidirectional-drift steering angle value. This midpoint moving speed is designed to be set as variable according to traveling states of the vehicle C inclusive of the vehicle speed.

The vehicle steering system according to the fourth embodiment can ensure both the comfort of steering feeling by moving the midpoint, and stability of the steering.

In addition, the vehicle steering system according to the fourth embodiment is designed, if a determination is made that the anti-unidirectional-drift control is operating, to prohibit updating the stored midpoint steering angle of the steering wheel H.

According to the vehicle steering system of the fourth embodiment, since updating the stored midpoint steering angle is prohibited when the midpoint steering angle (midpoint) is shifted from the original position due to the anti-unidirectional-drift control, such a situation can be prevented where the midpoint steering angle is erroneously stored, to perform the anti-unidirectional-drift control with high accuracy.

Other Embodiments

Embodiments described above are examples in which the present invention has been embodied. Therefore, these should not cause the technical scope of the present invention to be limitedly construed. This is because the present invention may be embodied in various modes, without departing from the spirit or essential features of the present invention.

For example, in the description according to the first embodiment of the present invention, as a member to determine whether or not the vehicle C is traveling straight, a description has been given by exemplarily showing the midpoint movement cancellation determining unit 1204, but the present invention is not limited to this example. Instead of the midpoint movement cancellation determining unit 1204, a configuration may be adopted that utilizes a navigation system to output, when the current position of the vehicle C is on a winding road or on a town street, a cancel signal to the integrating unit 1205.

In addition, in the description of the first to fourth embodiments of the present invention, the midpoint steering angle moving amount setting unit 1206 has been described with an example of setting the moving amount when moving the midpoint steering angle of the steering wheel H to the target anti-unidirectional-drift steering angle value, based on the integrated torque value. Here, the midpoint steering angle moving amount setting unit 1206 may be configured to increase the moving amount of the midpoint steering angle according to the magnitude of the integrated torque value, or the magnitude of the moving average value of the integrated torque value, so as to increase the moving amount of the midpoint steering angle as either of the values becomes larger. In this case, the configuration may be made such that when a vehicle behavior is disturbed (e.g., when the yaw rate or the steering angle is suddenly changed), the integrated torque value is cleared to zero or the moving average value of the integrated torque value is cleared to zero, to exclude a setting error on the moving amount of the midpoint steering angle.

Further, in the description of the first to fourth embodiments of the present invention, the switch 14 and the zero current value outputting unit 13 are not essential components. Therefore, the vehicle steering system according to the first to fourth embodiments may be configured by omitting these.

Furthermore, in the description of the first to fourth embodiments of the present invention, the midpoint steering angle moving amount setting unit 1206 has been described with the exemplary configuration to set the moving amount of the midpoint steering angle according to a predetermined procedure, when the integrated torque value exceeds the midpoint movement determination threshold value, but the present invention is not limited to this example. For example, a mode may be included in the technical scope of the present invention, in which the moving amount of the midpoint steering angle is set according to the magnitude of the integrated torque value obtained by multiplying the integrated torque value by a predetermined coefficient.

Moreover, in the description of the first to fourth embodiments of the present invention, a description has been given of an example of applying the present invention to the vehicle C equipped with an internal combustion engine, but the present invention is not limited to this example. The present invention can be applied to any kind of vehicles, such as an electric vehicle and a fuel cell vehicle. Incidentally, when the present invention is applied to an electric vehicle and a fuel cell vehicle, the cruise control may be implemented, for example, by performing a driving control over a traveling motor inverter for traveling at a constant speed.

Still further, in the description of the first to fourth embodiments of the present invention, a description has been given by exemplarily showing the FI_ECU 2 including the cruise control operating unit 21, but the present invention is not limited to this example. Instead of the cruise control operating unit 21, an adaptive cruise control (ACC) operating unit may be used, which automatically controls braking in addition to acceleration and deceleration to perform an operation for keeping a constant inter-vehicle distance.

Still furthermore, the technical idea of the present invention can be applied similarly to a case, for example, where if a hull of a boat is forced to flow laterally by a tide or a crosswind to cause a unidirectional flow behavior, a boat operator performs a steering effort on the steering wheel of the boat according to the magnitude of the unidirectional flow. In this case, claims may be applied to a boat or the like by reading the terms for a vehicle as those for a ship or the like.

The invention claimed is:

1. A vehicle steering system for a vehicle having a steering wheel mechanically connected with wheels so as to maintain a relative relationship between the steering wheel and the wheels, comprising:
   an electric motor that applies an assist torque for assisting the steering of the steering system of the vehicle;
   a steering torque detecting unit that detects a steering torque required for steering of the steering system;
   a steering angle detecting unit that detects a steering angle according to the steering system;
   a traveling state detecting unit that detects whether or not the vehicle traveling straight; and
   a control device that controls driving power of the electric motor based on vehicle information including the steering torque and the steering angle to impart the assist torque to the steering system,
   wherein the control device includes:
   an integrating unit that calculates an integrated torque value which is an integrated value of the steering torque; and
   a unidirectional drift controlling unit that performs a unidirectional drift control over the driving over of the electric motor so as to cancel the unidirectional drift behavior of the vehicle, based on the integrated torque value and mapping information of the driving power of the electric motor relative to a change in the integrated torque value.

2. The vehicle steering system according to claim 1, wherein the integrating unit calculates the integrated torque value that is the integrated value of the steering torque when the vehicle is traveling straight.

3. The vehicle steering system according to claim 1, wherein the anti-unidirectional-drift controlling unit obtains information of the driving power of the electric motor, which power is associated with the integrated torque value, based on the integrated torque value and the mapping information of the driving power of the electric motor relative to a change in the integrated torque value, and performs an operation for reducing high frequency components on the information of the driving power of the electric motor, to perform the unidirectional drift control over the driving power of the electric motor using the information of the driving power of the electric motor after the operation so as to cancel the unidirectional drift behavior of the vehicle.

4. The vehicle steering system according to claim 1, wherein the anti-unidirectional-drift controlling unit performs the unidirectional drift control over the driving power of the electric motor to cancel the unidirectional drift behavior of the vehicle based on the integrated torque value and the mapping information of the driving power of the electric motor relative to a change in the integrated torque value, by moving the midpoint of the steering system to a target anti-unidirectional-drift steering angle value.

5. The vehicle steering system according to claim 4, wherein an initial value of the anti-unidirectional-drift steering angle value is set to a predetermined value.

6. The vehicle steering system according to claim 5, wherein the steering angle detecting unit has a feature of detecting a steering angle of a steering wheel in the steering system, and the predetermined value is set to the steering angle value of the steering wheel detected by the steering angle detecting unit when the anti-unidirectional-drift controlling unit starts the anti-unidirectional-drift control.

7. The vehicle steering system according to claim 1, wherein the anti-unidirectional-drift controlling unit allows a cruise control operating unit, which performs a cruise control of the vehicle, to perform the anti-unidirectional-drift control if the cruise control operating unit is operating.

8. The vehicle steering system according to claim 1, wherein the anti-unidirectional-drift controlling unit increases control amount for the anti-unidirectional-drift control when a cruise control operating unit is operating for performing a cruise control of the vehicle, as compared to control amount for the anti-unidirectional-drift control when the cruise control operating unit is not operating.

9. The vehicle steering system according to claim 1, wherein the anti-unidirectional-drift controlling unit increases control amount, when the steering torque value is less than a predetermined threshold value, for the anti-unidirectional-drift control, assuming that constraint of a steering wheel in the steering system is released, as compared to control amount for the anti-unidirectional-drift control when the steering torque value is equal to or greater than the predetermined threshold value.

10. The vehicle steering system according to claim 1, further comprising
a traveling environment detecting unit that detects whether or not the vehicle is traveling in a low visibility environment,
wherein the anti-unidirectional-drift controlling unit decreases control amount, when the vehicle is traveling in a low visibility environment, for the anti-unidirectional-drift control, as compared to control amount for the anti-unidirectional-drift control when the vehicle is traveling in a high visibility environment.

11. The vehicle steering system according to claim 1, further comprising
a vehicle speed detecting unit that detects a vehicle speed,
wherein the anti-unidirectional-drift controlling unit decreases control amount, when the vehicle speed is less than a predetermined threshold value, for the anti-unidirectional-drift control, as compared to control amount for the anti-unidirectional-drift control when the vehicle speed is equal to or greater than the predetermined threshold value.

12. The vehicle steering system according to claim 1, wherein the anti-unidirectional-drift controlling unit decreases control amount, when the vehicle is turning left or right, for the anti-unidirectional-drift control, as compared to control amount for the anti-unidirectional-drift control when the vehicle is traveling straight.

13. The vehicle steering system according to claim 4, further comprising
a vehicle behavior stabilization controlling unit that performs a vehicle behavior stabilization control to stabilize the behavior of the vehicle,
wherein the anti-unidirectional-drift controlling unit decreases control amount, when the vehicle behavior stabilization control is performed, for the anti-unidirectional-drift control, as compared to control amount for the anti-unidirectional-drift control when the vehicle behavior stabilization control is not performed.

14. The vehicle steering system according to claim 1, further comprising
a bypass assist controlling unit that performs a bypass assist control to assist a bypass operation with respect to an obstacle around the vehicle,
wherein the anti-unidirectional-drift controlling unit decreases control amount, when the bypass assist control is performed, for the anti-unidirectional-drift control, as compared to control amount for the anti-unidirectional-drift control when the bypass assist control is not performed.

15. The vehicle steering system according to claim 1, further comprising
a lane-keeping assist controlling unit that performs a lane-keeping assist control to help the vehicle keep a lane,
wherein the anti-unidirectional-drift controlling unit decreases control amount, when the lane-keeping assist control is performed, for the anti-unidirectional-drift control, as compared to control amount for the anti-unidirectional-drift control when the lane-keeping assist control is not performed.

16. A vehicle steering system comprising:
an electric motor that applies an assist torque for assisting steering of a steering system of a vehicle;
a steering torque detecting unit that detects a steering torque required for steering of the steering system;
a steering angle detecting unit that detects a steering angle according to the steering system;
a traveling state detecting unit that detects whether or not the vehicle is traveling straight; and
a control device that, when the vehicle is traveling straight, controls driving power of the electric motor based on vehicle information including the steering torque and the steering angle to impart the assist torque to the steering system, wherein the control device includes:

an integrating unit that calculates an integrated torque value which is an integrated value of the steering torque; and an anti-unidirectional-drift controlling unit that performs a unidirectional drift control over the driving power of the electric motor so as to cancel unidirectional drift behavior of the vehicle, based on the integrated torque value and mapping information of the driving power of the electric motor relative to a change in the integrated torque value by moving a midpoint of the steering system to a target anti-unidirectional-drift steering angle value.

* * * * *